United States Patent
Hyodo

(10) Patent No.: US 9,467,677 B2
(45) Date of Patent: Oct. 11, 2016

(54) IMAGE PROCESSING METHOD, IMAGE PROCESSING DEVICE, AND ELECTRONIC APPARATUS

(71) Applicant: Sony Corporation, Tokyo (JP)

(72) Inventor: Yasuhide Hyodo, Tokyo (JP)

(73) Assignee: Sony Corporation, Tokyo (JP)

( * ) Notice: Subject to any disclaimer, the term of this patent is extended or adjusted under 35 U.S.C. 154(b) by 69 days.

(21) Appl. No.: 14/626,251

(22) Filed: Feb. 19, 2015

(65) Prior Publication Data

US 2015/0245008 A1    Aug. 27, 2015

(30) Foreign Application Priority Data

Feb. 26, 2014   (JP) .................................. 2014-035208

(51) Int. Cl.
- G06K 9/00 (2006.01)
- H04N 13/00 (2006.01)
- H04N 13/04 (2006.01)

(52) U.S. Cl.
CPC ...... *H04N 13/0037* (2013.01); *H04N 13/0018* (2013.01); *H04N 13/0033* (2013.01); *H04N 13/0402* (2013.01); *H04N 13/0445* (2013.01); *H04N 13/0409* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 2008/0079805 A1* | 4/2008 | Takagi | H04N 13/0018 348/51 |
| 2011/0032340 A1* | 2/2011 | Redmann | H04N 13/0018 348/51 |
| 2014/0016049 A1* | 1/2014 | Yoshikaie | G02F 1/1313 349/15 |
| 2014/0022339 A1* | 1/2014 | Dane | H04N 13/0033 348/42 |

(Continued)

FOREIGN PATENT DOCUMENTS

| | | |
|---|---|---|
| JP | 08-331600 A | 12/1996 |
| JP | 2006-115198 | 4/2006 |

OTHER PUBLICATIONS

Wang et al., Cross-talk reduction by correcting the subpixel position in a multiview autostereoscopic three dimensional display, Jun. 2010, Sichuan University, China, Applied optics Mar. 1, 2011/vol. 50, No. 7.*

(Continued)

*Primary Examiner* — Chan Park
*Assistant Examiner* — Iman K Kholdebarin
(74) *Attorney, Agent, or Firm* — Wolf, Greenfield & Sacks, P.C.

(57) ABSTRACT

There is provided an image processing method including analyzing contrast according to a spatial frequency of an input image for each RGB pixel, referencing a database in which a relationship between a crosstalk degradation amount and a disparity transition for each RGB pixel is stored in association with contrast according to spatial frequencies of various images, and acquiring a relationship between a crosstalk degradation amount and a disparity transition for each RGB pixel, the relationship corresponding to the contrast according to the spatial frequency of the input image, integrating the relationship between the crosstalk degradation amount and the disparity transition, the relationship having been acquired for each RGB pixel, and calculating disparity corresponding to a predetermined threshold set to the crosstalk degradation amount in the integrated relationship between the crosstalk degradation amount and the disparity transition.

11 Claims, 17 Drawing Sheets

(56) References Cited

U.S. PATENT DOCUMENTS

| | | | |
|---|---|---|---|
| 2014/0160301 A1* | 6/2014 | Tan | H04N 13/0007 348/191 |
| 2014/0267838 A1* | 9/2014 | Rubshtein | H04N 9/67 348/242 |
| 2014/0320599 A1* | 10/2014 | Blonde | H04N 13/0007 348/43 |
| 2015/0229904 A1* | 8/2015 | Ishikawa | H04N 13/0484 382/154 |

OTHER PUBLICATIONS

Chang et al., "10.2: Crosstalk Suppression by Image Processing in 3D Display," pp. 124-127, Instititue of Electro-Opitcal Engineering, National Chiao Tung University, Hsinchu, Taiwan, R.O.C.

* cited by examiner

EXAMPLE OF RELATIONSHIP BETWEEN VISUAL CHARACTERISTIC JND AND LUMINANCE

SV-CSF MODEL FOR
LUMINANCE STIMULUS

SV-CSF MODEL FOR
RED-GREEN STIMULUS

FIG. 13

VIEWPOINT NUMBER MAPPED TO PANEL

| row | Column1 | | | Column2 | | | Column3 | | |
|---|---|---|---|---|---|---|---|---|---|
| | 1R | 1G | 1B | 2R | 2G | 2B | 3R | 3G | 3B |
| 1 | 1 | 2 | 3 | 4 | 5 | 6 | 1 | 2 | 3 |
| 2 | 2 | 3 | 4 | 5 | 6 | 1 | 2 | 3 | 4 |
| 3 | 3 | 4 | 5 | 6 | 1 | 2 | 3 | 4 | 5 |
| 4 | 4 | 5 | 6 | 1 | 2 | 3 | 4 | 5 | 6 |
| 5 | 5 | 6 | 1 | 2 | 3 | 4 | 5 | 6 | 1 |
| 6 | 6 | 1 | 2 | 3 | 4 | 5 | 6 | 1 | 2 |
| 7 | 1 | 2 | 3 | 4 | 5 | 6 | 1 | 2 | 3 |
| 8 | 2 | 3 | 4 | 5 | 6 | 1 | 2 | 3 | 4 |
| 9 | 3 | 4 | 5 | 6 | 1 | 2 | 3 | 4 | 5 |
| 10 | 4 | 5 | 6 | 1 | 2 | 3 | 4 | 5 | 6 |
| 11 | 5 | 6 | 1 | 2 | 3 | 4 | 5 | 6 | 1 |
| 12 | 6 | 1 | 2 | 3 | 4 | 5 | 6 | 1 | 2 |

LIGHT QUANTITY RATIO OF SUB-PIXEL SEEN FROM GIVEN APPARENT POSITION

RESPECTIVE LIGHT QUANTITY RATIOS OF RGB ARE UNIFORM IN OBLIQUE DIRECTION
⇒ NO FALSE COLOR BECAUSE BALANCE OF RGB IS NOT LOST

| row | Column1 | | | Column2 | | | Column3 | | |
|---|---|---|---|---|---|---|---|---|---|
| | 1R | 1G | 1B | 2R | 2G | 2B | 3R | 3G | 3B |
| 1 | 0.13 | 0.3 | 1 | 0.3 | 0.13 | 0.1 | 0.13 | 0.3 | 1 |
| 2 | 0.3 | 1 | 0.3 | 0.13 | 0.1 | 0.13 | 0.3 | 1 | 0.3 |
| 3 | 1 | 0.3 | 0.13 | 0.1 | 0.13 | 0.3 | 1 | 0.3 | 0.13 |
| 4 | 0.3 | 0.13 | 0.1 | 0.13 | 0.3 | 1 | 0.3 | 0.13 | 0.1 |
| 5 | 0.13 | 0.1 | 0.13 | 0.3 | 1 | 0.3 | 0.13 | 0.1 | 0.13 |
| 6 | 0.1 | 0.13 | 0.3 | 1 | 0.3 | 0.13 | 0.1 | 0.13 | 0.3 |
| 7 | 0.13 | 0.3 | 1 | 0.3 | 0.13 | 0.1 | 0.13 | 0.3 | 1 |
| 8 | 0.3 | 1 | 0.3 | 0.13 | 0.1 | 0.13 | 0.3 | 1 | 0.3 |
| 9 | 1 | 0.3 | 0.13 | 0.1 | 0.13 | 0.3 | 1 | 0.3 | 0.13 |
| 10 | 0.3 | 0.13 | 0.1 | 0.13 | 0.3 | 1 | 0.3 | 0.13 | 0.1 |
| 11 | 0.13 | 0.1 | 0.13 | 0.3 | 1 | 0.3 | 0.13 | 0.1 | 0.13 |
| 12 | 0.1 | 0.13 | 0.3 | 1 | 0.3 | 0.13 | 0.1 | 0.13 | 0.3 |

FIG. 14

VIEWPOINT NUMBER MAPPED TO PANEL

|     | Column1 | | | Column2 | | | Column3 | | |
| --- | --- | --- | --- | --- | --- | --- | --- | --- | --- |
| row | 1R | 1G | 1B | 2R | 2G | 2B | 3R | 3G | 3B |
| 1 | 1 | 2 | 3 | 4 | 5 | 6 | 7 | 8 | 1 |
| 2 | 2 | 3 | 4 | 5 | 6 | 7 | 8 | 1 | 2 |
| 3 | 2 | 3 | 4 | 5 | 6 | 7 | 8 | 1 | 2 |
| 4 | 3 | 4 | 5 | 6 | 7 | 8 | 1 | 2 | 3 |
| 5 | 4 | 5 | 6 | 7 | 8 | 1 | 2 | 3 | 4 |
| 6 | 4 | 5 | 6 | 7 | 8 | 1 | 2 | 3 | 4 |
| 7 | 5 | 6 | 7 | 8 | 1 | 2 | 3 | 4 | 5 |
| 8 | 6 | 7 | 8 | 1 | 2 | 3 | 4 | 5 | 6 |
| 9 | 6 | 7 | 8 | 1 | 2 | 3 | 4 | 5 | 6 |
| 10 | 7 | 8 | 1 | 2 | 3 | 4 | 5 | 6 | 7 |
| 11 | 8 | 1 | 2 | 3 | 4 | 5 | 6 | 7 | 8 |
| 12 | 8 | 1 | 2 | 3 | 4 | 5 | 6 | 7 | 8 |

LIGHT QUANTITY RATIO OF SUB-PIXEL SEEN FROM GIVEN APPARENT POSITION

RESPECTIVE LIGHT QUANTITY RATIOS OF RGB ARE NOT UNIFORM IN OBLIQUE DIRECTION
⇒ FALSE COLOR OCCURS BECAUSE BALANCE OF RGB IS LOST

|     | Column1 | | | Column2 | | | Column3 | | |
| --- | --- | --- | --- | --- | --- | --- | --- | --- | --- |
| row | 1R | 1G | 1B | 2R | 2G | 2B | 3R | 3G | 3B |
| 1 | 0.1 | 0.13 | 0.45 | 0.74 | 0.55 | 0.14 | 0.1 | 0.1 | 0.1 |
| 2 | 0.11 | 0.25 | 0.73 | 0.66 | 0.19 | 0.11 | 0.1 | 0.09 | 0.11 |
| 3 | 0.16 | 0.65 | 0.71 | 0.34 | 0.12 | 0.1 | 0.1 | 0.1 | 0.16 |
| 4 | 0.45 | 0.74 | 0.55 | 0.14 | 0.1 | 0.1 | 0.1 | 0.13 | 0.45 |
| 5 | 0.73 | 0.66 | 0.19 | 0.11 | 0.1 | 0.09 | 0.11 | 0.25 | 0.73 |
| 6 | 0.71 | 0.34 | 0.12 | 0.1 | 0.1 | 0.1 | 0.16 | 0.65 | 0.71 |
| 7 | 0.55 | 0.14 | 0.1 | 0.1 | 0.1 | 0.13 | 0.45 | 0.74 | 0.55 |
| 8 | 0.19 | 0.11 | 0.1 | 0.09 | 0.1 | 0.25 | 0.73 | 0.66 | 0.19 |
| 9 | 0.12 | 0.1 | 0.1 | 0.1 | 0.16 | 0.65 | 0.71 | 0.34 | 0.12 |
| 10 | 0.1 | 0.1 | 0.1 | 0.3 | 0.45 | 0.74 | 0.55 | 0.14 | 0.1 |
| 11 | 0.1 | 0.09 | 0.11 | 0.25 | 0.73 | 0.66 | 0.19 | 0.1 | 0.12 |
| 12 | 0.1 | 0.1 | 0.16 | 0.65 | 0.71 | 0.34 | 0.12 | 0.1 | 0.1 |

IMAGE PROCESSING METHOD, IMAGE PROCESSING DEVICE, AND ELECTRONIC APPARATUS

CROSS REFERENCE TO RELATED APPLICATIONS

This application claims the benefit of Japanese Priority Patent Application JP 2014-035208 filed Feb. 26, 2014, the entire contents of which are incorporated herein by reference.

BACKGROUND

The present disclosure relates to an image processing method, an image processing device, and an electronic apparatus.

In recent years, stereoscopic display devices that can stereoscopically display content have been gaining widespread use. Such a stereoscopic display device horizontally shifts and displays an image for a right eye and an image for a left eye on a display, and adjusts a disparity amount on the basis of how much the images have been shifted, thereby displaying content in a given distance in the depth direction.

Stereoscopic display devices that display viewpoint images of two or more viewpoints sometimes suffer from a phenomenon in which rays of light leak into each viewpoint image from the adjacent viewpoint image because of the optical characteristics of the displays, the phenomenon being referred to as crosstalk. Once crosstalk occurs, an image that should not be originally displayed is displayed as a stereoscopic image for both of left and right eyes, considerably degrading the image quality. For example, FIG. 2 is a schematic diagram illustrating an example in which a viewed image experiences image ghosting and image doubling because of crosstalk. As illustrated in FIG. 2, crosstalk causes image ghosting and image doubling in an image, and larger disparity causes image ghosting and image doubling to increase.

Accordingly, techniques (see, for example, JP H08-331600A and JP 2006-115198A) have been developed which reduce crosstalk by subtracting a leakage amount of light from each viewpoint image in advance before each viewpoint image is displayed on a display, the light leaking into each viewpoint image from the adjacent viewpoint image. This crosstalk reduction process relies on a technique of using a linear matrix formula to model a process in which a leakage amount from an adjacent viewpoint image causes image ghosting and image doubling, and resolving the inverse problem (performing a contrast emphasis process through an inverse matrix process) to reduce image ghosting and image doubling (see, "10.2: Crosstalk Suppression by Image Processing in 3D Display," SID 10 DIGEST, ISSN 0097-966X/10/4101-0124-$1.00,2010 SID).

SUMMARY

However, gradation values of an image have a range limit (256 gradation (0 to 255) for 8 bits), and as a result of an inverse matrix process, the range of gradation may be exceeded. In such a case, the gradation values of an image are clipped so as to fall within the range, so that the process intended in the model is not achieved. In this case, an image that has undergone a crosstalk reduction process may have unnaturally high contrast and become unnatural. As illustrated in FIG. 2, since a larger disparity amount of content leads to more image ghosting and doubling caused by crosstalk, an inverse matrix process results in more emphasized contrast. Larger disparity thus causes more over-range of gradation, which bottlenecks crosstalk reducing performance.

Meanwhile, a technique of reducing image ghosting and doubling by controlling disparity has been known (see, for example, JP 2006-115198A). This technique takes a display characteristic into consideration to limit a display critical value of disparity of each viewpoint image to be displayed, and reduces image ghosting and doubling that is perceived by a user. However, some images may have the disparity limited by a set display critical value of disparity, although the images can have the disparity larger. Conversely, if disparity has a larger display critical value, some images may experience image ghosting and doubling, which may prevent a user from enjoying a video experience with a clear sense of presence. In other words, a correlation between an image feature, and image ghosting and doubling caused by crosstalk is not taken into consideration, so that the disparity display performance of a display is not sufficiently used.

In addition, a disparity device (such as a parallax element and a slit) that causes disparity is installed in a display that displays a glasses-free multi-viewpoint image. A glasses-free 3D display in which the slope of such a disparity device is not 3:1 unfortunately experience the degradation of image quality caused by color breakup because crosstalk for each RGB sub-pixel cyclically changes at each pixel position.

It is thus desired to minimize the degradation of image quality caused by color breakup, while using disparity display performance to the maximum.

According to an embodiment of the present disclosure, there is provided an image processing method including analyzing contrast according to a spatial frequency of an input image for each RGB pixel, referencing a database in which a relationship between a crosstalk degradation amount and a disparity transition for each RGB pixel is stored in association with contrast according to spatial frequencies of various images, and acquiring a relationship between a crosstalk degradation amount and a disparity transition for each RGB pixel, the relationship corresponding to the contrast according to the spatial frequency of the input image, integrating the relationship between the crosstalk degradation amount and the disparity transition, the relationship having been acquired for each RGB pixel, and calculating disparity corresponding to a predetermined threshold set to the crosstalk degradation amount in the integrated relationship between the crosstalk degradation amount and the disparity transition.

The image processing method may further include converting the calculated disparity into a phase difference on the basis of disparity of left and right images, and deciding the phase difference in a manner that a number of pixels exceeding a critical value among pixels of the input image is less than or equal to a given number.

The relationship between the crosstalk degradation amount and the disparity transition for each RGB pixel may be stored in the database in association with the contrast according to the spatial frequencies of the various images for each type of crosstalk ratio of each RGB pixel according to a slope of a parallax element installed in a display device that displays an image.

The relationship between the crosstalk degradation amount and the disparity transition may be acquired for each type of crosstalk ratio according to a slope of a parallax element installed in a display device that displays an image, the relationship corresponding to the contrast according to the spatial frequency of the input image.

The image processing method may further include creating the database through learning. The creating the database through learning may include analyzing, for each RGB pixel, contrast according to spatial frequencies of various images that have been input, and classifying the various images for each RGB pixel on the basis of the contrast according to the spatial frequency, and acquiring the relationship between the crosstalk degradation amount and the disparity transition for each RGB pixel through a crosstalk model formula.

According to another embodiment of the present disclosure, there is provided an image processing device including an analysis unit configured to analyze contrast according to a spatial frequency of an input image for each RGB pixel, a disparity transition information acquiring unit configured to reference a database in which a relationship between a crosstalk degradation amount and a disparity transition for each RGB pixel is stored in association with contrast according to spatial frequencies of various images, and to acquire a relationship between a crosstalk degradation amount and a disparity transition for each RGB pixel, the relationship corresponding to the contrast according to the spatial frequency of the input image, an integration unit configured to integrate the relationship between the crosstalk degradation amount and the disparity transition, the relationship having been acquired for each RGB pixel, and a disparity calculation unit configured to calculate disparity corresponding to a predetermined threshold set to the crosstalk degradation amount in the integrated relationship between the crosstalk degradation amount and the disparity transition.

According to still another embodiment of the present disclosure, there is provided an electronic apparatus including an analysis unit configured to analyze contrast according to a spatial frequency of an input image for each RGB pixel, a disparity transition information acquiring unit configured to reference a database in which a relationship between a crosstalk degradation amount and a disparity transition for each RGB pixel is stored in association with contrast according to spatial frequencies of various images, and to acquire a relationship between a crosstalk degradation amount and a disparity transition for each RGB pixel, the relationship corresponding to the contrast according to the spatial frequency of the input image, an integration unit configured to integrate the relationship between the crosstalk degradation amount and the disparity transition, the relationship having been acquired for each RGB pixel, a disparity calculation unit configured to calculate disparity corresponding to a predetermined threshold set to the crosstalk degradation amount in the integrated relationship between the crosstalk degradation amount and the disparity transition, a phase difference converting unit configured to convert the calculated disparity into a phase difference on the basis of disparity of left and right images, a phase difference deciding unit configured to decide the phase difference in a manner that a number of pixels exceeding a critical value among pixels of the input image is less than or equal to a given number, and a display unit configured to display the input image on the basis of the phase difference decided by the phase difference deciding unit.

According to yet another embodiment of the present disclosure, there is provided an image processing method including analyzing contrast according to a spatial frequency of an input image, the input image being acquired when an RGB image is converted into a luminance image, referencing a database in which a relationship between a crosstalk degradation amount and a disparity transition is stored in association with contrast according to spatial frequencies of various images, and acquiring a relationship between a crosstalk degradation amount and a disparity transition, the relationship corresponding to the contrast according to the spatial frequency of the input image, and calculating disparity corresponding to a predetermined threshold set to the crosstalk degradation amount in the acquired relationship between the crosstalk degradation amount and the disparity transition.

The image processing method may further include converting the calculated disparity into a phase difference on the basis of disparity of an image for a left eye and an image for a right eye, and deciding the phase difference in a manner that a number of pixels exceeding a critical value among pixels of the input image is less than or equal to a given number.

According to a further embodiment of the present disclosure, there is provided an image processing device including an analysis unit configured to analyze contrast according to a spatial frequency of an input image, the input image being acquired when an RGB image is converted into a luminance image, a disparity transition information acquiring unit configured to reference a database in which a relationship between a crosstalk degradation amount and a disparity transition is stored in association with contrast according to spatial frequencies of various images, and to acquire a relationship between a crosstalk degradation amount and a disparity transition, the relationship corresponding to the contrast according the spatial frequency of the input image, and a disparity calculation unit configured to calculate disparity corresponding to a predetermined threshold set to the crosstalk degradation amount in the acquired relationship between the crosstalk degradation amount and the disparity transition.

According to a still further embodiment of the present disclosure, there is provided an electronic apparatus including an analysis unit configured to analyze contrast according to a spatial frequency of an input image, the input image being acquired when an RGB image is converted into a luminance image, a disparity transition information acquiring unit configured to reference a database in which a relationship between a crosstalk degradation amount and a disparity transition is stored in association with contrast according to spatial frequencies of various images, and to acquire a relationship between a crosstalk degradation amount and a disparity transition, the relationship corresponding to the contrast according the spatial frequency of the input image, a disparity calculation unit configured to calculate disparity corresponding to a predetermined threshold set to the crosstalk degradation amount in the acquired relationship between the crosstalk degradation amount and the disparity transition, a phase difference converting unit configured to convert the calculated disparity into a phase difference on the basis of disparity of left and right images, a phase difference deciding unit configured to decide the phase difference in a manner that a number of pixels exceeding a critical value among pixels of the input image is less than or equal to a given number, and a display unit configured to display the input image on the basis of the phase difference decided by the phase difference deciding unit.

According to one or more of embodiments of the present disclosure, it is possible to minimize the degradation of image quality caused by color breakup, while using disparity display performance to the maximum.

Note that the advantageous effects described above are not necessarily limited, but any advantageous effects that are shown in the present specification or any other advantageous

BRIEF DESCRIPTION OF THE DRAWINGS

FIG. 13 is a plan view illustrating RGB sub-pixels and crosstalk ratios thereof, the schematic diagram illustrating crosstalk ratios dependent on slope of a disparity element;

FIG. 14 is a plan view illustrating RGB sub-pixels and crosstalk ratios thereof, the schematic diagram illustrating crosstalk ratios dependent on slope of a disparity element;

DETAILED DESCRIPTION OF THE EMBODIMENT(S)

Figure 1:
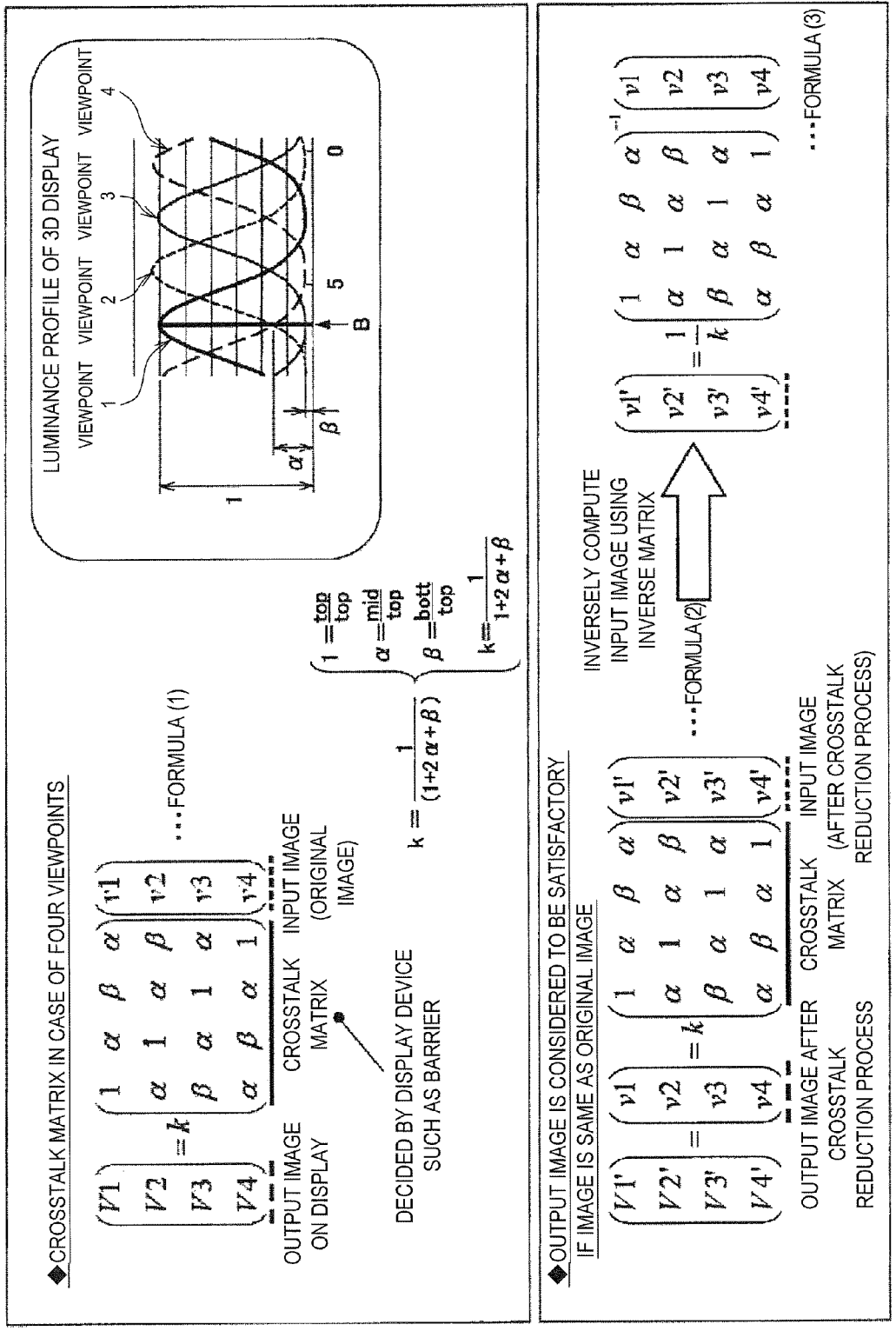
FIG. 1 is a schematic diagram illustrating a model formula of crosstalk.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Here, the description will be made in the following order.
1. First Embodiment
1.1. Model Formula of Crosstalk
1.2. Estimation of Disparity Transition of Crosstalk Degradation Amount ΔI through Learning
1.3. Application to Disparity Control Algorithm
1.4. Electronic Apparatus according to Present Embodiment
1.5. Regarding Modified Example
2. Second Embodiment 1. First Embodiment 1.1. Model Formula of Crosstalk In the present embodiment, taking into consideration a correlation between an image feature and an image having image ghosting and an image having image doubling (which will be referred to as image ghosting and doubling) caused by crosstalk, disparity control under which the disparity display performance of a display is exhibited to the maximum is exerted. A correlation of image ghosting and doubling caused by crosstalk and an image feature is derived from a model formula of crosstalk illustrated in FIG. 1.

In order to describe the gist of the present embodiment, first of all, a perception degradation model of image ghosting and doubling will be described. In general, the degradation of image quality can be objectively evaluated using a difference value between a reference image F which serves as a reference of evaluation and an evaluation image G which is a target of the evaluation. If the definition is applied to the occurrence of image ghosting and doubling in a stereoscopic display device, the reference image F is an original image (an image that is originally desired to be displayed) and the evaluation image G is an image that is actually viewed when disparity is applied. A difference value between the evaluation image G and the reference image F is an amount of degradation caused by crosstalk. This computation is performed using gradation values of an image, however, a relationship between gradation values of an image and physical luminance of a pixel is clarified as a γ characteristic. That is to say, an amount of degradation caused by crosstalk is defined as a physical amount (luminance). A computation method using gradation values of an image will be shown below.

Figure 3:
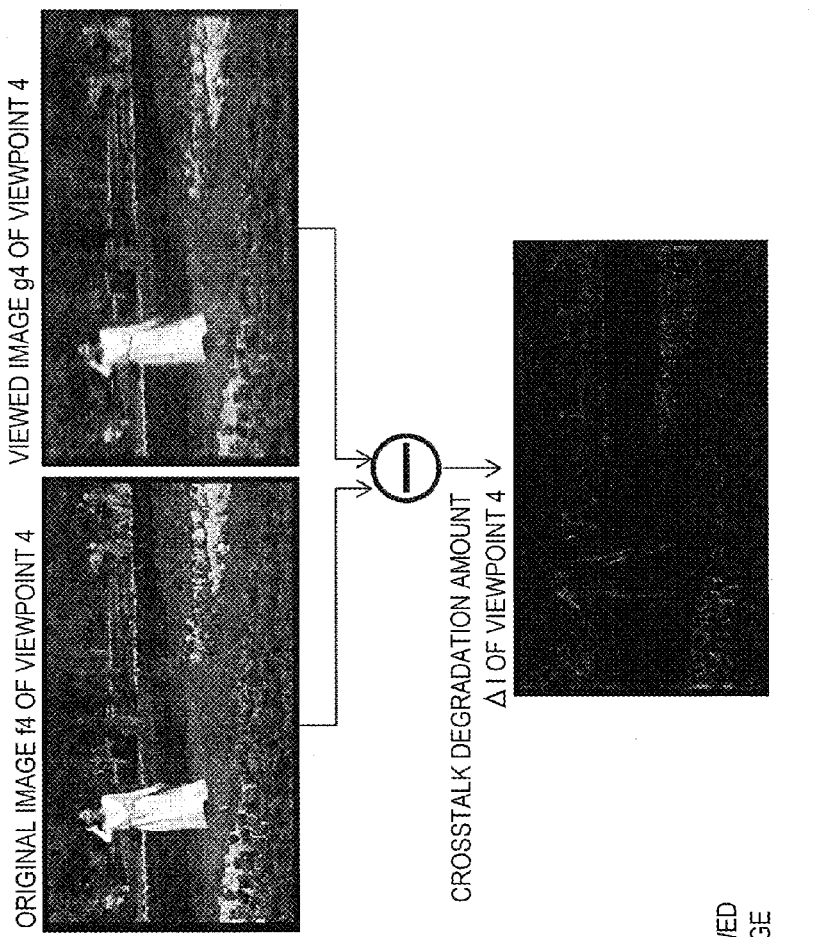
FIG. 3 s a schematic diagram illustrating a method for computing an amount of degradation caused by crosstalk.
Figure 6:
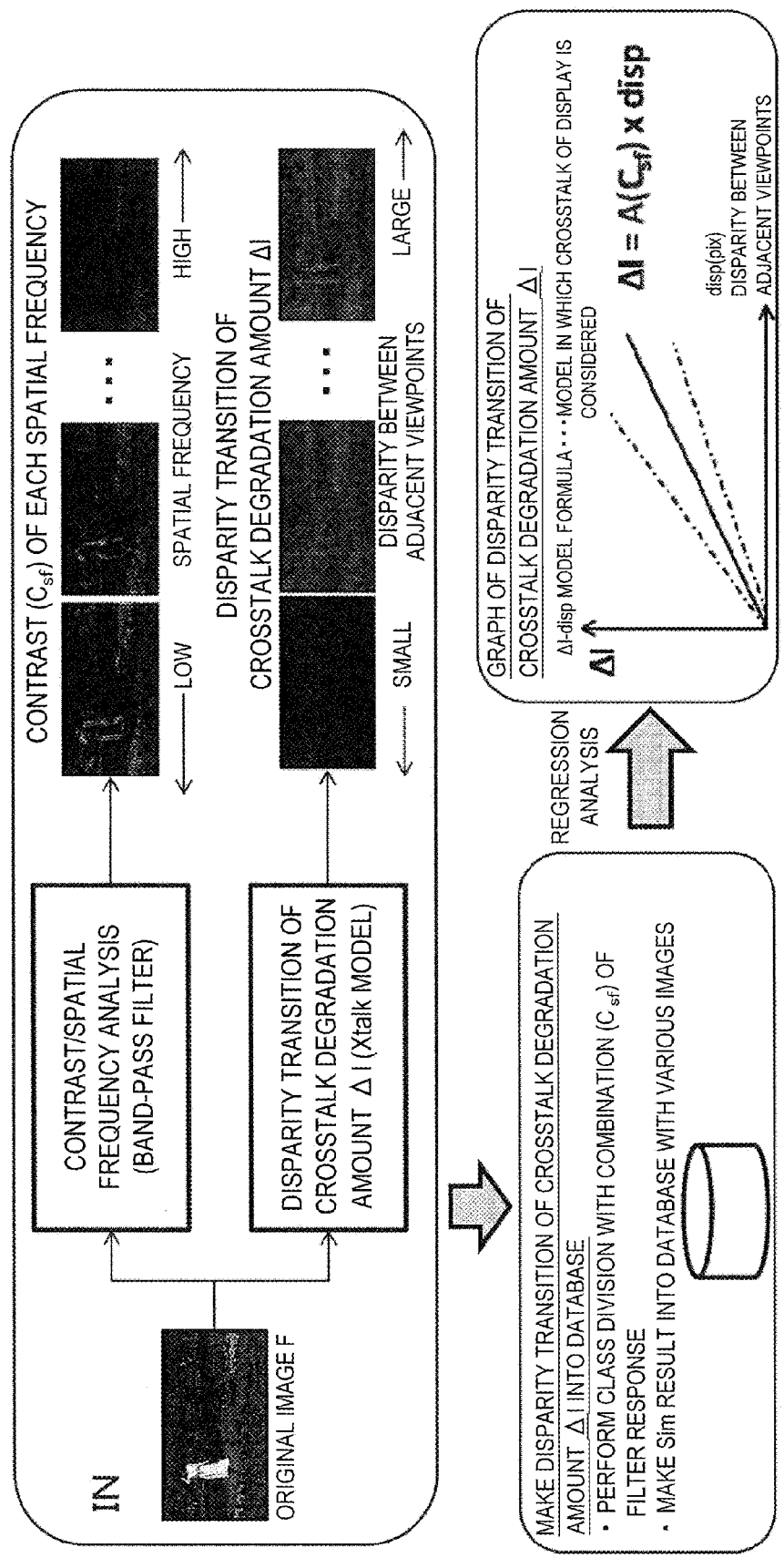
FIG. 6 is a schematic diagram illustrating an example of a learning method for a disparity transition graph of the crosstalk degradation amount ΔI.

FIG. 3 is a schematic diagram illustrating a method of computing a degradation amount using a crosstalk model formula. First of all, using a crosstalk model, a viewed image G is computed from an original image F. The crosstalk model can be obtained from a luminance profile of a display. When, for example, eyes are at the position at which a viewpoint 5 is viewed as illustrated in FIG. 6, the image of the viewpoint 5 is dominantly viewed and intensity thereof is set to 1. At this time, the viewpoints 4 and 6 adjacent to the aforementioned viewpoint is viewed to the extent of α, the second adjacent viewpoints 3 and 7 are viewed to the extent of β, and viewpoints separated further therefrom are viewed to the extent of γ. Even in the cases in which the eyes are at positions other than the viewpoint 5, a relationship of 1, α, β, and γ can be obtained. An expression in which a relationship of the original image F and the viewed image G is defined as a matrix based on this relationship is a crosstalk model matrix. As illustrated in FIG. 3, the crosstalk model matrix is defined as a diagonal matrix having elements of 1, α, β, and γ. When the crosstalk model matrix is integrated with the reference image F (original image), the viewed image G can be generated. The crosstalk model matrix has a characteristic as a low-pass filter that causes image ghosting and doubling in an image.

Next, a difference value between the viewed image G (evaluation image) and the reference image F (original image), i.e. a crosstalk degradation amount ΔI, is obtained. In the figure in the lower right part of FIG. 3, a difference between the viewed image G (evaluation image) and the reference image F (original image) is obtained with respect to the viewpoint 4, and then the crosstalk degradation amount ΔI is obtained. The crosstalk degradation amount ΔI is expressed with luminance, and in the figure in the lower right part of FIG. 3, an area having higher luminance has a larger crosstalk degradation amount ΔI. If the iterative computation is repeated by changing the disparity, a disparity transition of the crosstalk degradation amount ΔI can be obtained as image data.

Figure 2:
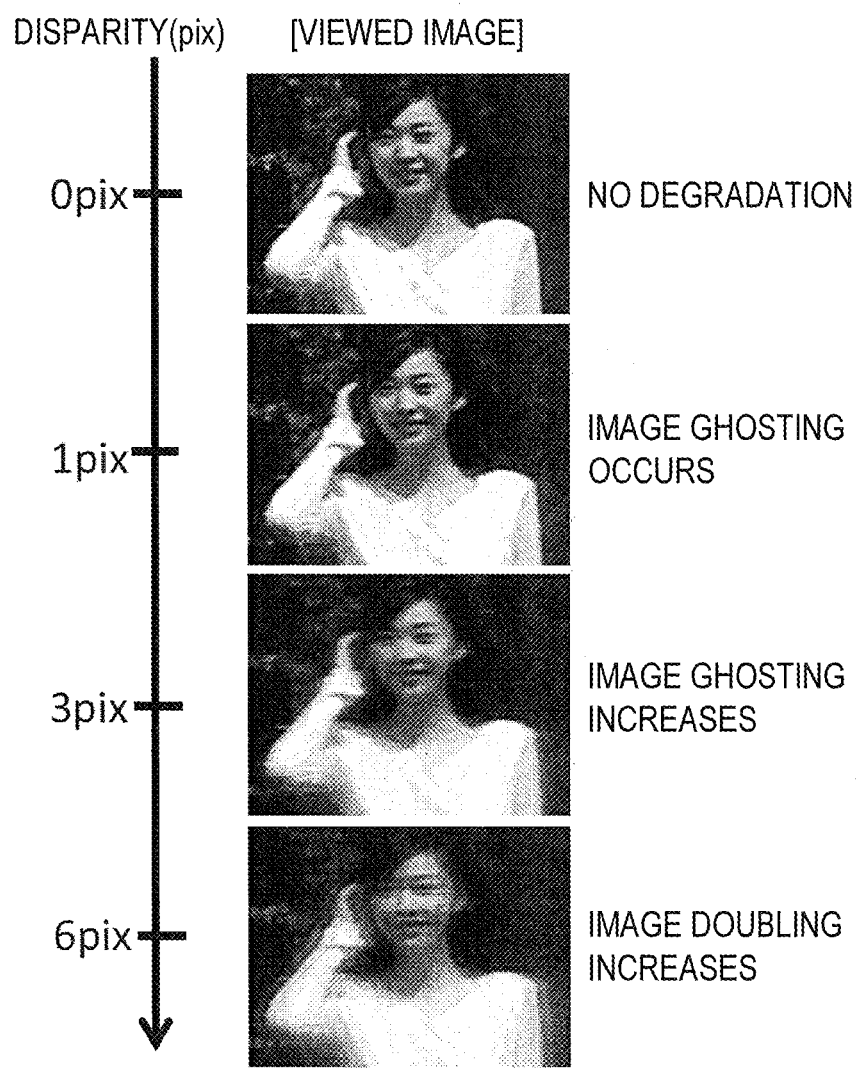
FIG. 2 s a schematic diagram illustrating an example in which a viewed image experiences image ghosting and image doubling because of crosstalk.
Figure 4:
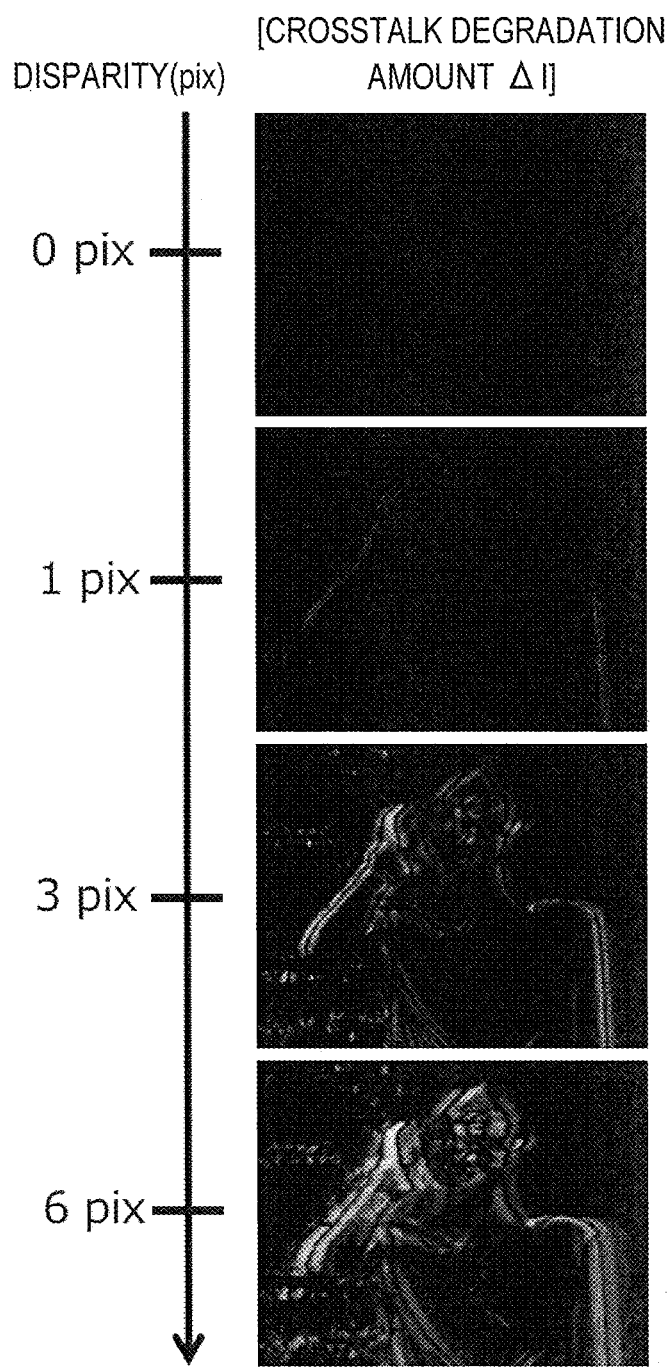
FIG. 4 is a schematic diagram illustrating disparity dependency of a crosstalk degradation amount ΔI.

FIG. 4 is a schematic diagram illustrating disparity dependency of the crosstalk degradation amount ΔI. FIG. 4 illustrates a state in which disparity is set to have values sequentially increasing from 0 pixels (pix) to one pixel (pix), three pixels (pix), and six pixels (pix) and accordingly crosstalk of the viewed image G illustrated in FIG. 2 is degraded. For example, an image whose disparity has a value of 0 pixels is a two-dimensional image, and a position of a three-dimensional image to be displayed in the depth direction is away from a reference position (on a display plane) when the disparity has a value of 0 pixels or more. As illustrated in FIG. 4, when disparity increases, the crosstalk degradation amount ΔI tends to also increase. When the crosstalk degradation amount ΔI exceeds a predetermined threshold value, a person perceives image ghosting and doubling, and perceives image quality degrading.

In the present embodiment, using crosstalk of a device and an image feature, disparity in which the number of pixels at which generate image ghosting and doubling occur is kept equal to or less than a given number (such as 1% of the number of pixels of a whole image) is decided.

Next, a specific implementation method will be described. The present embodiment includes two parts made of estimation of a disparity transition of a crosstalk degradation amount ΔI through learning and application to disparity control algorithm. These two parts will be sequentially described.

1.2. Estimation of Disparity Transition of Crosstalk Degradation Amount ΔI through Learning As described above, by repeating the iterative computation of FIG. 3 for each of pixels and thereby obtaining a crosstalk degradation amount ΔI for each of the pixels, disparity in which the number of pixels at which image ghosting and doubling occur is kept equal to or less than a given number (such as 1% of the number of pixels of a whole image) can be decided. When, however, a real-time moving image processing is implemented using the matrix expression illustrated in FIG. 3, the computation of the matrix has to be repeated until a crosstalk degradation amount ΔI exceeds the above-described threshold for the perception of image ghosting and doubling, and accordingly a calculation amount increases. Thus, in the present embodiment, by using contrast/spatial frequency dependency of the crosstalk degradation amount ΔI in addition to the disparity dependency of the crosstalk degradation amount ΔI, a framework for estimating a disparity transition of the crosstalk degradation amount ΔI is constructed.

Figure 5:
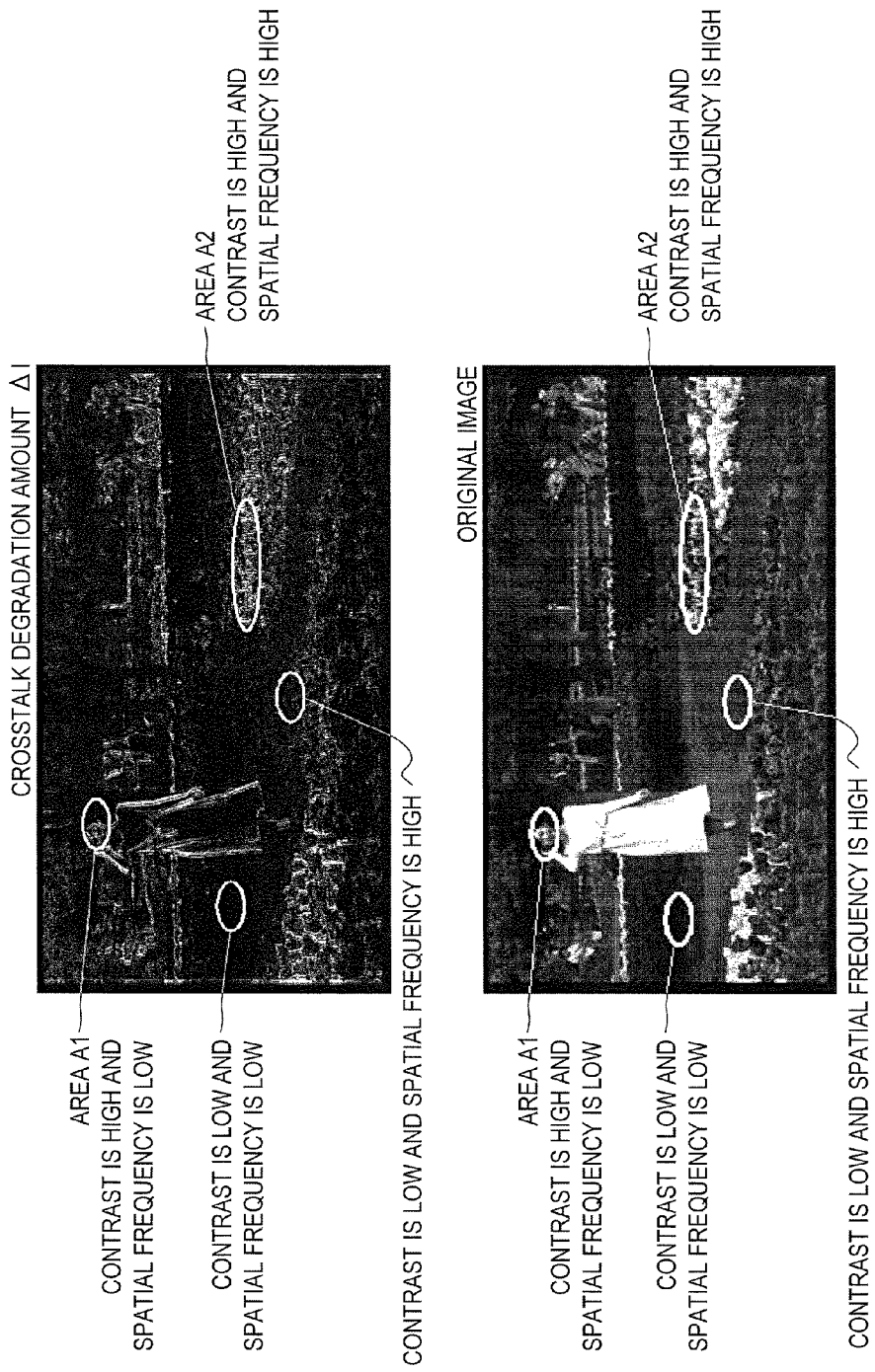
FIG. 5 is a schematic diagram illustrating contrast/spatial frequency dependency of the crosstalk degradation amount ΔI.

FIG. 5 is a schematic diagram illustrating contrast/spatial frequency dependency of a crosstalk degradation amount ΔI. FIG. 5 illustrates a crosstalk degradation amount when disparity of a multi-viewpoint image is uniformly applied as in FIG. 4, illustrating that a disparity of five pixels (pix) is applied to the whole screen as an example. Here, the figure in the upper part of FIG. 5 illustrates a crosstalk degradation amount ΔI that is obtained from a difference between a viewed image G (evaluation image) and a reference image F (original image) using the method illustrated in FIG. 3. In addition, the figure in the lower part of FIG. 5 illustrates the reference image F (original image). As in FIG. 3, the white portions in the image in the upper part illustrating the crosstalk degradation amount ΔI indicate portions having large crosstalk degradation amounts.

As illustrated in FIG. 5, a crosstalk degradation amount ΔI sharply increases as contrast becomes higher and a spatial frequency becomes higher. For example, when crosstalk degradation amounts ΔI of the face of a person (area A1) in the left part of FIG. 5 and the stems of flowers (area A2) in the right part are compared to each other, the area A2 around the stems of the flowers is whiter than the area A1 around the face in the figure in the upper part of FIG. 5, and thus the crosstalk degradation amount ΔI thereof is large. Meanwhile, in the original image, when the contrast/spatial frequencies of the areas A1 and A2 are compared, both of the face of the person (area A1) and the stems of the flowers (area A2) have the same degree of contrast (dynamic range of a regional gradation change), but the face of the person has a low spatial frequency (wide gap of spatial changes in gradation) and the stems of the flowers have a high spatial frequency (narrow gap of spatial changes in gradation). In addition, areas with low contrast generally have small crosstalk degradation amounts ΔI, but the crosstalk degradation amounts ΔI vary according to spatial frequencies even if contrast is the same. As such, the crosstalk degradation amount ΔI tends to increasingly change as disparity increases, and the characteristic of the change has dependency on contrast/spatial frequency. Thus, the dependency of the crosstalk degradation amount ΔI on disparity/contrast/spatial frequency can be expressed using the following formula.

$$\Delta I(C_{sf}, \text{disp}) = \Sigma_{i=0}^{N-1}(s_i(\text{disp}) \times C_i) + N(\sigma),$$

$$C_{sf} = (C_0 C_1, \ldots, C_{N-1}) \quad \text{(formula 1)}$$

Here, $C_{sf}$ represents a contrast vector which is decomposed into N vectors for each spatial frequency, $C_i$ represents contrast of a spatial frequency i, $s_i$ represents a coefficient which indicates a degree of influence of certain disparity on the degradation of the contrast $C_i$, disp represents disparity, and $N(\sigma)$ represents a residual. Furthermore, the first term of the formula 1 can be expressed as follows.

$$\Delta I(C_{sf}, \text{disp}) = \widehat{\Delta I}(C_{sf}, \text{disp}) = N(\sigma), \quad \text{(formula 2)}$$

When $C_{sf}$ indicating contrast/spatial frequency of the formula 2 is considered to be fixed, the first term (which is referred to as ΔI hat) on the right side can be interpreted as a statistical value of a disparity transition of the crosstalk degradation amount ΔI of $C_{sf}$. Using this feature, a disparity transition graph of the crosstalk degradation amount ΔI is learned in advance offline, and a learning result thereof is applied to real-time image processing.

FIG. 6 is a schematic diagram illustrating an example of a learning method of the disparity transition graph of the crosstalk degradation amount ΔI. Here, the learning method will be described by dividing the method into four steps. In a first step of learning, the contrast/spatial frequency of an original image F are analyzed. Specifically, using N band-pass image filters, the original image F is decomposed into contrast maps of N spatial frequencies. Here, as a band-pass filter, for example, an existing band-pass image filter such as a Gabor filter and an LOG filter can be used. Frequency components are hereby decomposed into N in number for each spatial frequency as outputs of the N filters, and a contrast vector $C_{sf}=(C_0, C_1, \ldots, C_{N-})$ which indicates a relationship of contrast-spatial frequency is obtained for each pixel. Each component (element) of the contrast vector $C_{sf}$ indicates contrast of each spatial frequency.

As a second step, a map of the crosstalk degradation amount ΔI is generated with various types of disparity. Specifically, multi-viewpoint images are generated while changing disparity amounts (deviation amounts of pixels) of viewpoint images, and a crosstalk degradation amount ΔI is obtained for each disparity using a crosstalk model. In this step, a map of the crosstalk degradation amount ΔI is computed for each image based on various types of disparity. That is to say, sample data for computing the statistical value ΔI hat of the formula 2 is computed. The crosstalk model of FIG. 3 is used only for creating the sample data.

As a third step, disparity transitions of the crosstalk degradation amounts ΔI are made into a database. Specifically, using the dependency of the crosstalk degradation amount ΔI on contrast/spatial frequency, an image is divided into classes for each $C_{sf}$ indicating contrast/spatial frequency, and disparity transition data of the crosstalk degradation amounts ΔI is retained in each class.

As an example, comparison of the crosstalk degradation amounts ΔI of the face of the person (area A1) in the left part and the stems of the flowers (area A2) in the right part described in FIG. 5 will be described. As described above, the face of the person (area A1) in the left part and the stems of the flowers (area A2) in the right part of FIG. 5 have the same degree of contrast, but have different distribution of spatial frequencies. Regarding the distribution of spatial frequencies, a spatial frequency of the face of the person is present dominantly in a low band, and a spatial frequency of the stems of the flowers is present dominantly in a high band.

Figure 7:
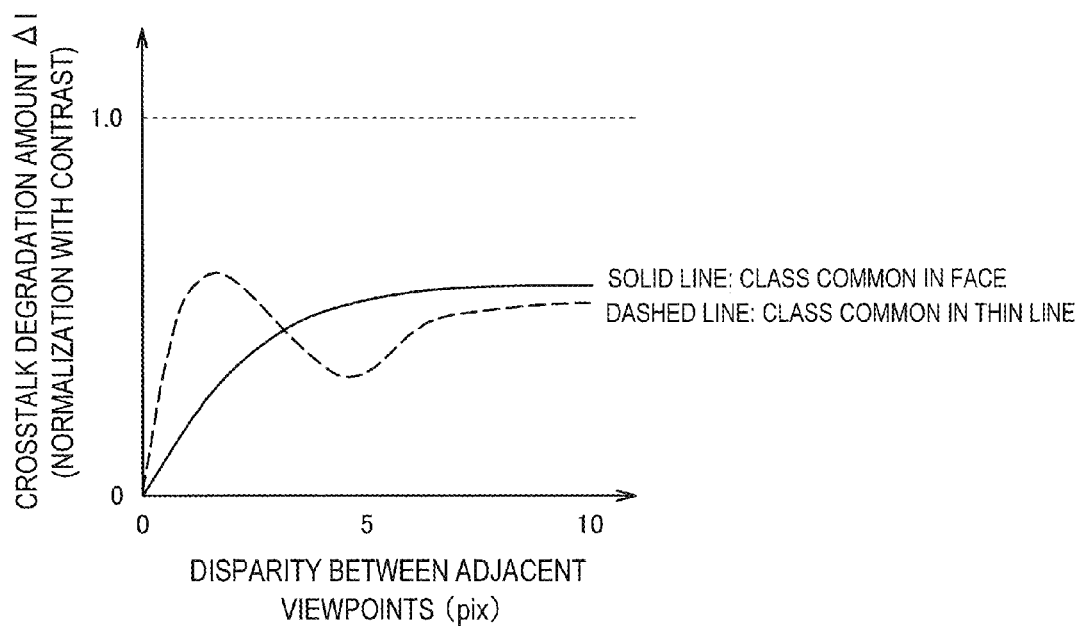
FIG. 7 is a characteristic diagram illustrating an analysis result of learning data (average of sample data for each class)

Based on FIG. 7, the first to the third steps described above will be described in detail. FIG. 7 is a characteristic diagram illustrating a result of analysis of learning data (average of sample data of each class). FIG. 7 illustrates an example in which the number of filters is set to N=4, and responses of band-pass filters are normalized with contrast of a dominant spatial frequency set to 1 for comparison at the same contrast, and class division is performed according to ratios of the responses of the filters.

In the example illustrated in FIG. 7, contrast vectors $C_{sf}=(C_0, C_1, C_2, C_3)=$(r1cpd, r2cpd, r4cpd, r8cpd) whose components are decomposed for each of spatial frequencies by four filters are obtained (first step). FIG. 7 illustrates contrast vectors corresponding to classes common in an image of the face of a person (area A1) and classes common in an image with a thin line such as the stems of flowers (area A2) according to the components of the obtained contrast vectors. As described above, a spatial frequency of the face of a person is present dominantly in a low band, and a spatial frequency of the stems of flowers is present dominantly in a high band. Thus, with regard to the contrast vectors classified into the classes common in an image of the face of a person, components corresponding to low spatial frequency bands are larger than components corresponding to high spatial frequency bands. In addition, with regard to the contrast vectors classified into the classes common in an image with a thin line such as the stems of flowers, components corresponding to high spatial frequency bands are larger than components corresponding to low spatial frequency bands.

Thus, an image can be divided into classes on the basis of components of contrast vectors. By performing a filtering process on an image, it is possible to determine whether the image is an image that belongs to, for example, a class of the image of the face of a person (area A1), a class of the image of the stems of flowers (area A2), or another class.

With regard to the contrast vectors corresponding to the classes common in the image of the face of a person (area A1) and the classes common in the image with a thin line such as the stems of flowers (area A2), multi-viewpoint images are generated while changing disparity amounts (deviation amounts of pixels) of viewpoint images, and a crosstalk degradation amount ΔI is obtained for each disparity using a crosstalk model (second step) as illustrated in FIG. 7. Accordingly, a disparity transition graph of the crosstalk degradation amounts ΔI resulting from differences of spatial frequencies is created for each of the classes (indicated in a solid line in FIG. 7) common in the image of the face of a person (area A1) and the classes (indicated in the dashed line in FIG. 7) common in the image with a thin line such as the stems of flowers (area A2) as illustrated in FIG. 7. When the two disparity transition graphs are compared to each other, it can be ascertained as a result that, while the disparity transition of the crosstalk degradation amount ΔI tends to gently increase in the classes of contrast/spatial frequency distributed highly in the face of a person (area A1) in the left part, the disparity transition of the crosstalk degradation amount ΔI tends to sharply increase in the classes of contrast/spatial frequency distributed highly in the stems of flowers (area A2) in the right part. This coincides with the qualitative analysis described in FIG. 5.

Next, as a fourth step, using the least-square method, a regression analysis is carried out on the disparity transition data of the crosstalk degradation amount ΔI of each class obtained in the third step, and the disparity transition of the crosstalk degradation amount ΔI is made into a function. Through the regression analysis, the crosstalk degradation amount ΔI can be calculated as a function of disparity/contrast/spatial frequency, i.e. ΔI hat. In this step, for compression of information, the crosstalk degradation amount ΔI is made into a function having disparity/contrast/spatial frequency as arguments. In the example of FIG. 7, regarding the classes of contrast/spatial frequency distributed highly in the face of a person (area A1) in the left part, a function in which the crosstalk degradation amount ΔI (longitudinal axis) gently increases (indicated in a solid line of FIG. 7) if compared with the amount of an increase of disparity (transverse axis) is obtained. In addition, regarding the classes of contrast/spatial frequency distributed highly in the stems of flowers (area A2) in the right part, a function in which the crosstalk degradation amount ΔI (longitudinal axis) sharply increases (indicated in a dashed line of FIG. 7) if compared with the amount of an increase of disparity (transverse axis) is obtained. Accordingly, the crosstalk degradation amount ΔI can be expressed as the following formula.

$$\Delta I = A(C_{sf}) \times \text{disp}$$

If a table having a sufficient amount of data can be retained, the average of the crosstalk degradation amounts ΔI can be computed for each class, and retained as a table of data rather than as a function. In addition, to make a function, method of having a linear or non-linear type, or retaining a polygonal line, a domain, and a codomain may be applied.

The graph illustrated in the lower right part of FIG. 6 indicates a graph obtained in the fourth step. Additionally, FIG. 6 illustrates an example in which a relationship of the crosstalk degradation amount ΔI and disparity is made into a linear function. In the example illustrated in FIG. 6, the slope of a characteristic indicating a relationship of the crosstalk degradation amount ΔI and disparity changes according to the type of image. As described above, the classes distributed highly in the face of a person (area A1) form a characteristic C1 having a gentle slope, and the classes distributed highly in the stems of flowers (area A2) form a characteristic C2 having a steep slope. Through the four steps above, ΔI hat indicated in the formula 2 can be computed through learning.

As such, ΔI hat obtained through leaning is constructed as a database (such as a function and a table) which defines a relationship between disparity and the crosstalk degradation amount ΔI for each contrast vector $C_{sf}$.

Figure 8:
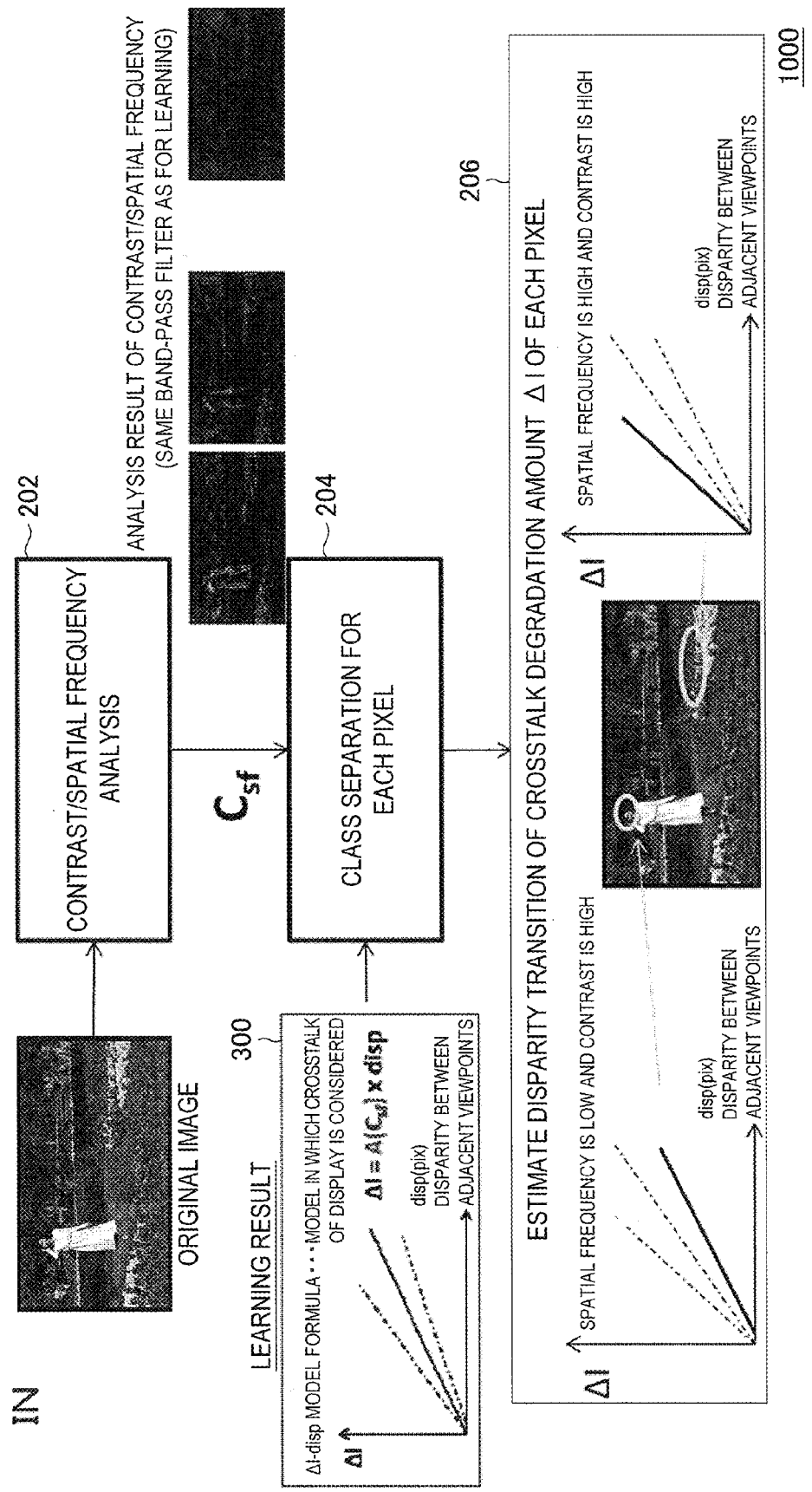
FIG. 8 is a schematic diagram illustrating a method for estimating a disparity transition of the crosstalk degradation amount ΔI for an unknown image by using a learning result.

Next, a method will be described for estimating a disparity transition of a crosstalk degradation amount ΔI for an unknown image on the basis of a learning result. FIG. 8 is a schematic diagram illustrating a method for estimating a disparity transition of a crosstalk degradation amount ΔI for an unknown image on by using a learning result. As illustrated in FIG. 8, an image processing device 1000 according to the present embodiment has algorithm for estimating a disparity transition of a crosstalk degradation amount ΔI. The algorithm for estimating a disparity transition of a crosstalk degradation amount ΔI includes a contrast/spatial frequency analyzing unit 202, a class separation unit 204 that makes a class separation for each pixel, and a disparity transition estimating (acquiring) unit 206 that estimates (acquires) a disparity transition of a crosstalk degradation amount ΔI of each pixel. First of all, an input image is input to the contrast/spatial frequency analyzing unit 202. The contrast/spatial frequency analyzing unit 202 filters the input image with N band-pass filters, and acquires contrast $C_{sf}=(C_0, C_1, \ldots, C_{N-1})$ of each of N spatial frequencies for each pixel. This filtering is applied in the same way as for learning (first step). The contrast $C_{sf}$ acquired in this way and having a component of each of spatial frequencies is input to the class separation unit 204.

The class separation unit 204 references data of a learning result, and makes a class separation for the input contrast $C_{sf}$ of each of spatial frequencies on the basis of $C_{sf}$ representing the contrast/spatial frequency defined at learning. As discussed above, a database of ΔI hat that defines a relationship between disparity and a crosstalk degradation amount ΔI has been constructed for each contrast vector $C_{sf}$ through leaning. Thus, a class separation for the contrast $C_{sf}$ of the input image based on the component decides a first argument ($C_{sf}$) of a function ΔI hat in the database.

Thus, the class separation unit 204 can acquire, from the database of the function ΔI hat, a disparity transition graph (ΔI-disp graph) having disparity as a variable, the disparity transition graph (ΔI-disp graph) corresponding to the contrast vector $C_{sf}$ of the input image.

The estimation unit 206 estimates a disparity transition of a crosstalk degradation amount ΔI for each pixel of the input image on the basis of the disparity transition graph (ΔI-disp graph) corresponding to the contrast vector $C_{sf}$ of the input image, the disparity transition graph (ΔI-disp graph) being extracted by the class separation unit 204 from the database 300. In this way, if statistical data through leaning is used, it is possible to estimate for an unknown image in accordance with the class to what extent disparity is necessary to cause a crosstalk degradation amount ΔI, and how large the caused crosstalk degradation amount ΔI is.

1.3. Application to Disparity Control Algorithm

The description has been made so far for the method for estimating a disparity transition of a crosstalk degradation amount ΔI through learning. Next, algorithm will be described, the algorithm using this estimation method to control disparity in a manner that no image ghosting and doubling occur, and using the disparity display performance of a display to the maximum.

Figure 9:
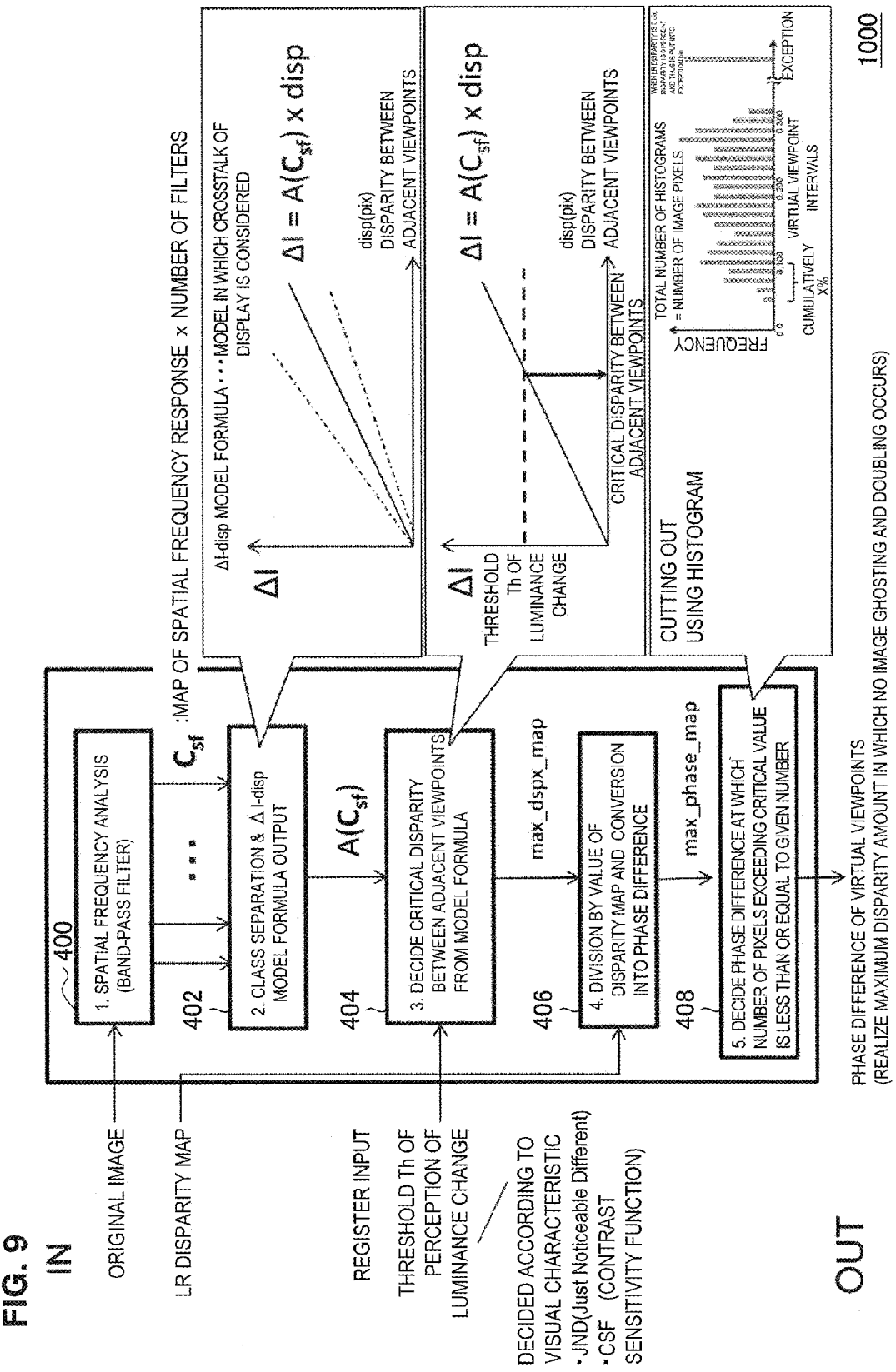
FIG. 9 is a schematic diagram for describing a process flow of disparity control algorithm.

FIG. 9 is a schematic diagram for describing a process flow of disparity control algorithm according to the present embodiment. This process flow is generally divided into five steps. As above, an original image is analyzed with N band-pass filters in a first step, and contrast $C_{sf}=(C_0, C_1, \ldots, C_{N-1})$ of each of N types of spatial frequency is acquired for each pixel.

A class separation is made on the basis of the contrast $C_{sf}=(C_0, C_1, \ldots, C_{N-1})$ of each of N types of spatial frequency in a second step, and a function or a table for a disparity transition of a crosstalk degradation amount ΔI in the corresponding class from learning data is acquired for each pixel. If a linear function as illustrated in the lower right part of FIG. 6 is acquired as a function of a disparity transition of a crosstalk degradation amount ΔI, the slope $A(C_{sf})$ of the function is acquired.

A threshold Th of perception of the crosstalk degradation amount ΔI is set for the function or the table of the disparity transition of the crosstalk degradation amount ΔI in a third step, the function or the table having been acquired in the second step. The number of pixels which correspond to disparity in which the crosstalk degradation amount ΔI reaches the threshold Th of perception is then calculated for each pixel. Specifically, the threshold Th is input to the crosstalk degradation amount ΔI of the function or the table, the inverse function is searched for for the function and corresponding disparity is searched for for the table, and an amount of the corresponding disparity is obtained. Here, since the crosstalk degradation amount ΔI is expressed by luminance, the threshold Th of degradation perception is set by luminance that is optically measured. To give an example, let us assume that the threshold Th of degradation perception is a gradation value corresponding to 30 cd/m², and the threshold Th is ΔI=30 cd/m².

Furthermore, in order to further reflect the perception characteristic of a human, the threshold Th of degradation perception can be adaptively decided for each pixel by taking into consideration a visual characteristic of a human (contrast sensitivity function (CSF), and a Just Noticeable Difference (JND)). Accordingly, the threshold Th can be set while differences of spatial frequencies are taken into consideration.

Figure 11:
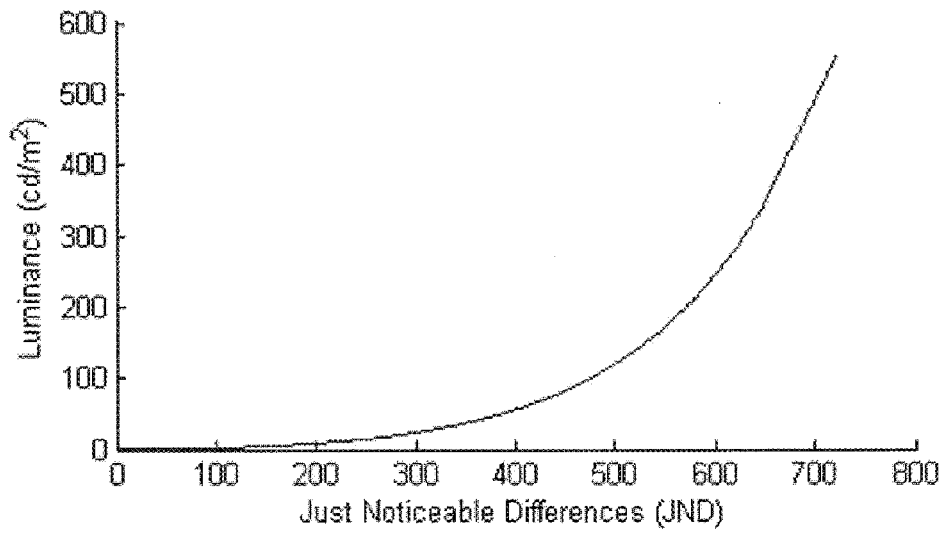
FIG. 11 is a characteristic diagram illustrating a relationship between a visual characteristic JND and luminance.

FIG. 11 is a characteristic diagram illustrating a relationship between a visual characteristic JND and luminance. As illustrated in FIG. 11, it is known that a human does not perceive a luminance change in the same way as a physical amount, but perceives a luminance change in the form of a logarithmic function. Specifically, in an area with a relatively low luminance, the visual characteristic of a human gently increases for an increase in a physical amount (cd/m²) of the luminance. In addition, in an area with a relatively high luminance, the visual characteristic of a human sharply increases for an increase in a physical amount (cd/m²) of the luminance rather than in a dark area. If the adaptive threshold is set to adaTh, adaTh is obtained using the following formula. Additionally, the threshold Th is decided for each pixel because a spatial frequency is different for each pixel.

$$adaTh = f(Csf, Y_{ave}, Th) \quad \text{(formula 3)}$$

Here, $Y_{ave}$ is lighting luminance around a pixel, and can be obtained by filtering an image using a smoothing filter such as a Gaussian filter. The formula 3 qualitatively means that the adaptive threshold adaTh of degradation perception can be computed with $C_{sf}$ of contrast/spatial frequency, lighting luminance $Y_{ave}$ around a pixel, and a fixed threshold Th (constant) of degradation perception. Note that the fixed threshold Th can be set to 30 cd/m² as an example.

Furthermore, the formula 3 can be computed as, for example, the following formula 4.

$$adaTh = Th \times JND(Y_{ave}) \times \sum_{i=0}^{N-1} \left\{ \left( \frac{Ci}{\sum_{k=0}^{N-1} C_k} \right) \times \frac{1}{CSF(Ci)} \right\} \quad \text{(formula 4)}$$

The formula 4 qualitatively means that the adaptive threshold adaTh of degradation perception is obtained by integrating a constant term Th, a perception gain JND that varies according to the lighting luminance $Y_{ave}$ around a pixel, and a perception gain that varies according to contrast vectors $C_{sf}$ of respective spatial frequencies that an image has.

Figure 12:
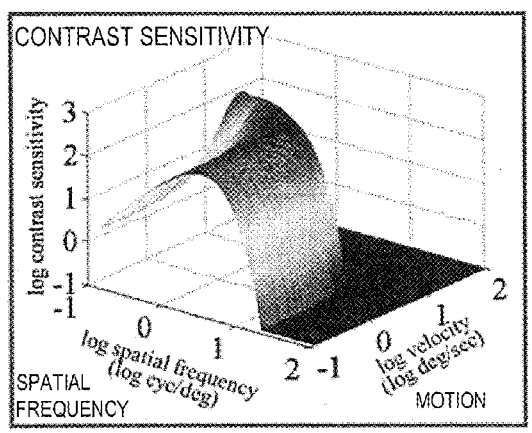
FIG. 12 is a characteristic diagram illustrating a relationship between a spatial frequency, motion of an object in an image, and contrast sensitivity.
Figure 12:
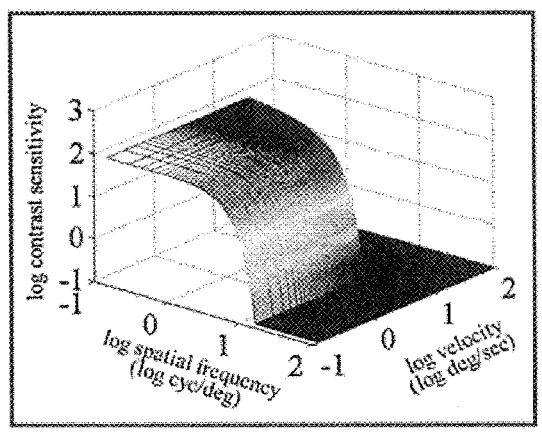

Furthermore, it is also known that contrast sensitivity changes due to motion information of an object such as motion blur. FIG. 12 is a characteristic diagram illustrating a relationship between a spatial frequency, a motion of an object in an image, and contrast sensitivity. As indicated in a model for a luminance stimulus in FIG. 12, contrast sensitivity increases as a motion of an object becomes large. That is to say, when a motion of an object becomes fast, it becomes difficult to recognize image ghosting and doubling.

In addition, as illustrated in FIG. 12, if a spatial frequency is excessively high, contrast sensitivity is difficult to perceive. For this reason, when a spatial frequency is high, a threshold at which a luminance change is perceived can be set even higher. In addition, when a motion is fast, contrast sensitivity is difficult to perceive. For this reason, a threshold at which a luminance change is perceived can be set even higher when a motion is fast. In this case, motion information is added to an argument of the contrast sensitivity function (CSF) of the formula 4, and a perception gain of contrast/spatial frequency can be changed.

As described above, when the luminance threshold Th or adaTh of degradation perception is obtained, the inverse function for a function and corresponding disparity for a table are searched for, and then a disparity amount corresponding to the threshold is obtained. When the function of the disparity transition of the crosstalk degradation amount ΔI is obtained in the second step as illustrated in FIG. 9, a maximum disparity amount max_dspx in which degradation is not perceived is obtained for each pixel as a disparity amount corresponding to the threshold. The same applies to the table, and a maximum disparity amount max_dspx in which degradation is not perceived can be obtained for each pixel.

The flow for computing a maximum disparity amount max_dspx in which degradation is not perceived has been described so far using up to the above-described third step. If the face of a person (area A1) and the stems of flowers (area A2) in FIG. 5 are described as an example, it is possible to acquire information indicating that a disparity of about 5 pixels can be applied to the face of a person and a disparity of about 2 pixels can be applied to the stems of flowers.

Meanwhile, the information acquired here does not take a front-to-back relationship of objects into consideration. When disparity control of a 3D image is actually exerted, it is necessary to control disparity while keeping the front-to-back relationship of objects. Accordingly, an idea of a phase difference of a viewpoint image will be used. For example, when LR stereo images are used, a phase of the L image is defined as 0.0 and a phase of the R image is defined as 1.0. The use of phases in this way allows the front-to-back relationship of an object to be kept in a viewpoint image to be displayed, and a maximum disparity amount (phase difference) in which degradation is not perceived to be decided.

Accordingly, the disparity max_dspx obtained in the third step is converted into a maximum phase difference max_phase at which degradation is not perceived in a fourth step. Conversion is carried out for each pixel. Specifically, the following formula is used.

$$\text{max\_phase} = \begin{cases} \text{max\_dspx/lr\_dspx} & \text{if lr\_dspx} \neq 0 \\ & \text{or max\_dspx/lr\_dspx} < \text{clip\_phase} \\ \text{clip\_phase} & \text{otherwise} \end{cases} \quad \text{(formula 5)}$$

In the formula 5, lr_dspx represents disparity of LR images, and clip_phase represents a maximum phase difference set from the outside. That is to say, the codomain of the maximum phase difference max_phase at which degradation is not perceived satisfies 0≤max_phase≤clip_phase. The maximum phase difference max_phase represents a value obtained by dividing max_dspx obtained in the third step by the disparity of the left and right (LR) images. Accordingly, the maximum disparity amount max_dspx is converted into the maximum phase difference max_phase of the left and right images, and accordingly a front-to-back relationship between objects is taken into consideration. The disparity lr_dspx of the LR images represents a value of disparity between left and right eyes in each pixel of an input image, and defined for each pixel in the input image on the basis of a LR disparity map that is separately input to the image processing device 1000.

In this example, a system in which a multi-viewpoint image is generated from the LR images is assumed, but it can be computed in the same manner also in other methods such as an image, + a depth map by performing conversion into a deviation amount (disparity) that is projected when viewpoint images are generated from the depth map. Accordingly, a disparity map of critical adjacent viewpoints of each pixel can be converted into a phase difference map of adjacent viewpoints of 3D images (phase map: a map which guides a level of phase difference to be applied).

As described above, a maximum phase difference at which degradation is not perceived can be obtained for each pixel in the fourth step. If the face of a person (area A1) and the stems of flowers (area A2) in FIG. 5 are described as an example, it is possible to acquire information indicating that disparity corresponding to a phase difference of about at most about 0.20 can be applied to the face of a person and disparity corresponding to a phase difference of at most about 0.10 can be applied to the stems of flowers.

A phase difference of a viewpoint image that is actually displayed is decided in a fifth step. The map of a maximum phase difference max_phase at which degradation is not perceived is used in this step to decide disparity for keeping the number of pixels at which degradation is perceived less than or equal to a given number (such as 1% of the number of pixels in a whole image), the map having been acquired in the fourth step.

Figure 10:
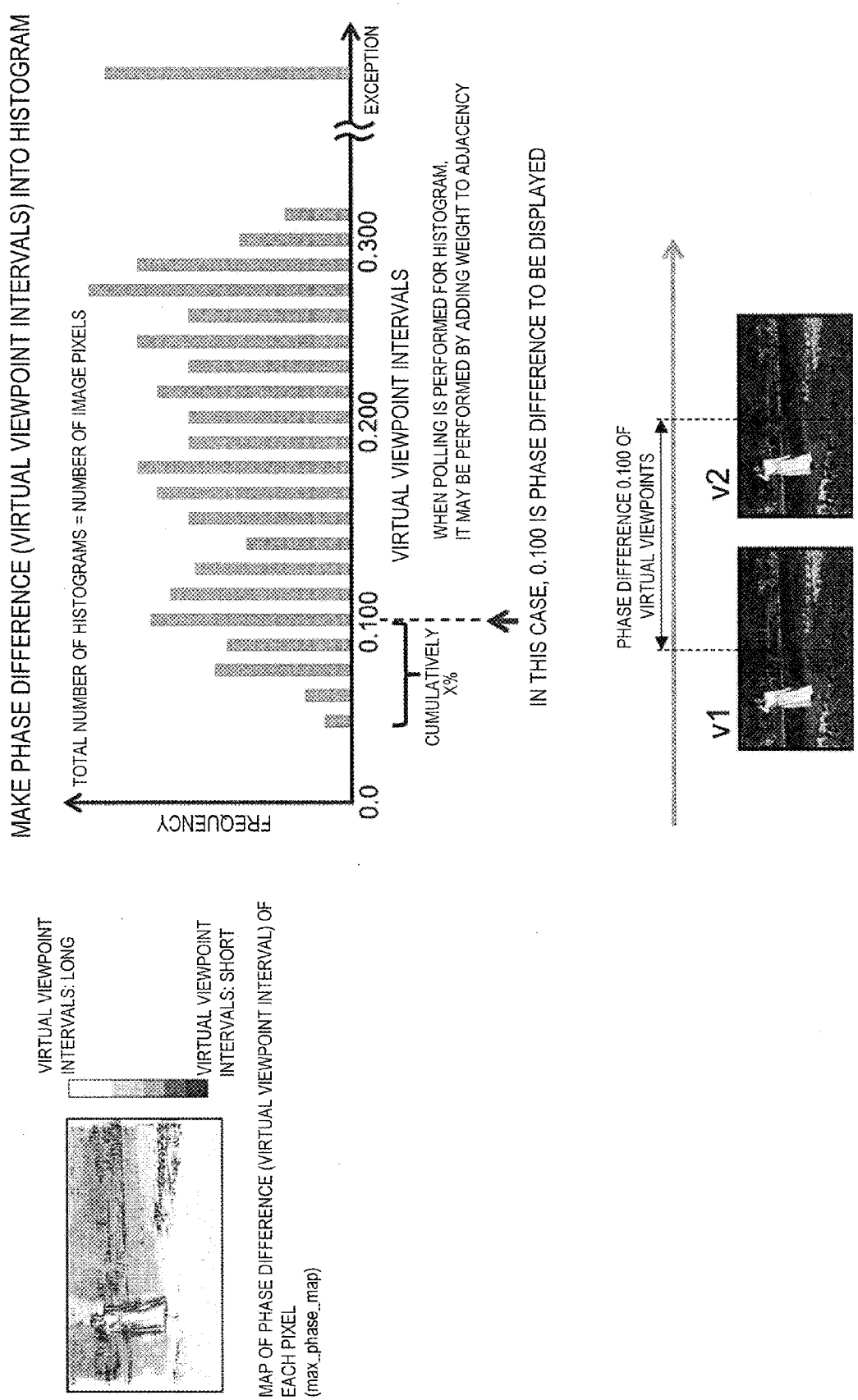
FIG. 10 illustrates a method for deciding a phase difference of a viewpoint image in a fifth step, the viewpoint image being actually displayed.

FIG. 10 illustrates a method for deciding a phase difference of a viewpoint image that is actually displayed in the fifth step. As illustrated in FIG. 10, first of all, as a histogram, the appearance frequency of each max_phase value is counted for the value of the max_phase map obtained in the fourth step. Next, the cumulative sum is computed from the frequency of a smaller max_phase value in the histogram. A phase difference at which the cumulative sum exceeds a threshold CutTh is decided as a phase difference opt_phase of a viewpoint image that is actually displayed.

For example, a case in which a numeric value of CutTh= (the total number of pixels)×1% is set for the example of the face of a person (area A1) and the stems of flowers (area A2) of FIG. 5 will be described. When the cumulative value of the histogram is computed, the phase difference at which the cumulative sum exceeds the threshold CutTh is about 0.100. At this moment, disparity equivalent to a maximum phase difference at which degradation of image quality is perceived is applied to the stems of flowers, and degradation of image quality is not perceived in the remaining 99% of the areas. That is to say, the maximum phase difference at which degradation of the image quality is not perceived in a whole image is displayed, and the disparity display performance of a display can be sufficiently exhibited.

As illustrated in FIG. 9, the image processing device 1000 includes a spatial frequency analyzing unit 400, a disparity transition information acquiring unit 402, an adjacent viewpoint disparity calculating unit 404, a conversion unit 406, and a phase difference deciding unit 408. The first to fifth steps of the disparity control algorithm are performed at the spatial frequency analyzing unit 400, the disparity transition information acquiring unit 402, the adjacent viewpoint disparity calculating unit 404, the conversion unit 406, and the phase difference deciding unit 408. As discussed above, the spatial frequency analyzing unit 400 analyzes a spatial frequency of an input image. The disparity transition information acquiring unit 402 extracts a function or a table of a disparity transition of a crosstalk degradation amount ΔI. The adjacent viewpoint disparity calculating unit 404 decides the disparity between adjacent viewpoints on the basis of a threshold. The conversion unit 406 converts the disparity between adjacent viewpoints into a phase difference. The phase difference deciding unit 408 decides a phase difference at which the number of pixels exceeding a critical value is less than or equal to a given number. Additionally, the spatial frequency analyzing unit 400 corresponds to the contrast/spatial frequency analyzing unit 202 in FIG. 6, while the disparity transition information acquiring unit 402 corresponds to the disparity transition estimating (acquiring) unit 206 in FIG. 6.

1.4. Electronic Apparatus according to Present Embodiment

Figure 18:
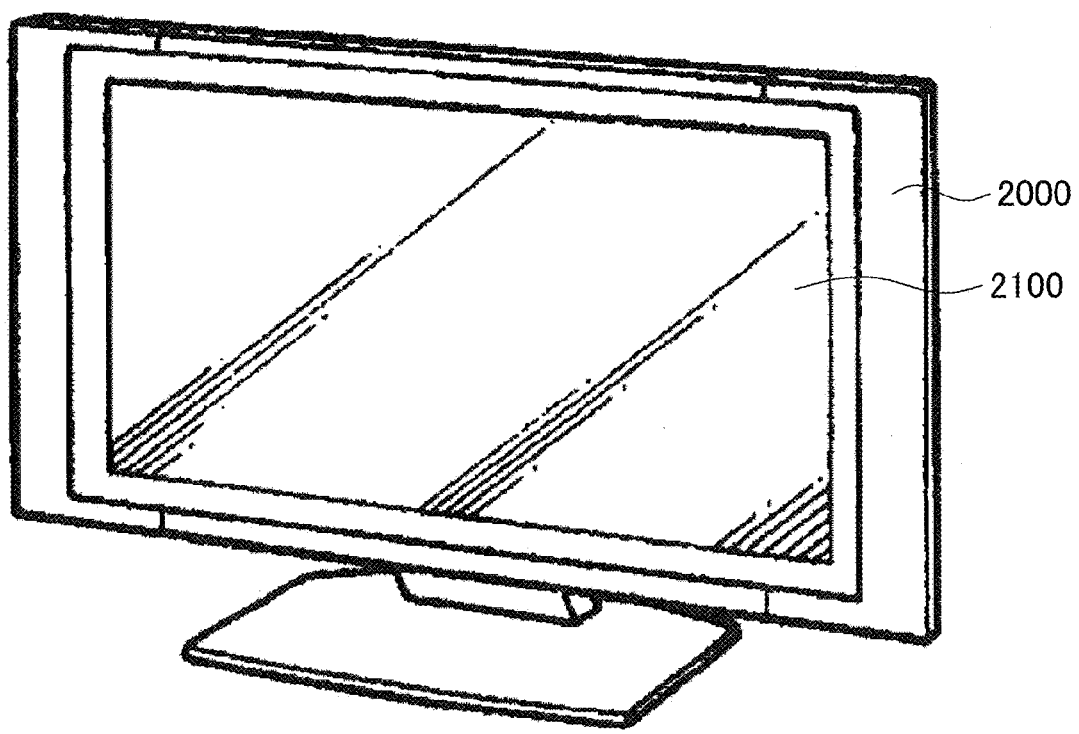
FIG. 18 is a schematic diagram illustrating an electronic apparatus.

An input image on which the image processing device 1000 according to the present embodiment performs image processing is displayed by a display unit 2100 of an electronic apparatus 2000 such as a liquid crystal display device (LCD) illustrated in FIG. 18. The electronic apparatus 2000 according to the present embodiment thus includes the image processing device 1000 and the display unit 2100. Examples of the electronic apparatus 2000 include a television receiver, a mobile phone, a mobile device such as a smartphone, and a device such as a digital camera. An input image on which the image processing device 1000 has performed image processing is displayed on the display unit, so that it is possible to use the disparity display performance to the maximum and to minimize crosstalk.

1.5. Regarding Modified Example

A multi-eye type glasses-free 3D display has been used for convenience of explanation in the present embodiment to describe the disparity control algorithm for a situation in which an observer enjoys an image in a designed visual distance. The distribution of crosstalk on a display surface is uniform in the designed visual distance of a multi-eye type glasses-free 3D display, and a crosstalk model is uniquely decided in this simple case. However, an application target of an embodiment of the present disclosure is not limited to a multi-eye type glasses-free 3D display, but an embodiment of the present disclosure can also be applied to another type of glasses-free 3D display (such as a glasses-free 3D display using an integral imaging method), which experiences image ghosting and doubling caused by crosstalk. A crosstalk model applied to learning is modified depending on a target.

Determinant factors of a target are generally divided into three of a device characteristic (luminance/crosstalk angular distribution), a display method (multi-eye method/integral imaging method), and a visual distance (designed visual distance/viewing in another visual distance). These determinant factors vary the distribution of crosstalk on a display surface. In this case, a representative value is selected from the distribution of crosstalk on a display surface to construct a crosstalk model matrix, and the crosstalk model matrix is applied to the process according to the present embodiment.

For example, if a value at which a crosstalk ratio is maximum (image quality is the most likely to degrade) is selected as a representative value from the distribution of crosstalk on a display surface, and is applied to an embodiment of the present disclosure, it is possible to exert disparity control on the basis of a display characteristic in an area in which the image quality is the most likely to degrade, so that the image quality is maintained as a whole screen and the disparity control that allows the display to use the disparity display performance to the maximum can be exerted. If a value at which a crosstalk ratio has an intermediate value (crosstalk having an intermediate characteristic between a characteristic of the worst image quality and a characteristic of the best image quality) is selected as a representative value from the distribution of crosstalk on a display surface, and is applied to an embodiment of the present disclosure, it is possible to perform a process that takes a tradeoff of a characteristic of the image quality of a whole screen into consideration, and to enlarge the disparity.

According to the present embodiment, if a test pattern of a sine wave pattern is used as an input image, it is possible to change contrast/spatial frequency and illumination luminance of an image and to confirm whether the process according to the present embodiment is performed or not. The cycle of a spatial change in a sine wave pattern represents a spatial frequency, and the amplitude represents contrast. In addition, a DC component of a sine wave pattern represents illumination luminance (average luminance) of an image. If the present embodiment is applied, contrast of a sine wave pattern, a spatial frequency, disparity, and illumination luminance of an image cause a crosstalk degradation amount ΔI, and disparity is controlled in a manner that the crosstalk degradation amount ΔI falls within a threshold of luminance decided by the contrast, the spatial frequency, and the illumination luminance of an image. Optical measurement allows this to be confirmed. Specifically, it is possible to measure the crosstalk degradation amount ΔI as a physical amount in a real space by optically measuring the luminance of an observation image (reference image) in which disparity is forcibly made 0 and the luminance of an observation image (evaluation image) to which disparity is applied, and obtaining a difference in the luminance, and to confirm whether the process according to the present embodiment is performed or not.

As described above, according to the present embodiment, it is possible to use the disparity display performance of a display to the maximum by taking into consideration an image feature (contrast/spatial frequency) in addition to a display characteristic (crosstalk and luminance) and estimating, with high accuracy, a critical disparity amount in which image ghosting and doubling occurs.

It is possible to optimize a stereoscopic sense, a sense of depth, and image quality in a tradeoff relationship, thereby allowing a user to have a video experience with a clear sense of presence. The technology is of great versatility, and is adjustable for a display having a different design without relying on a user's experience. Furthermore, since a crosstalk degradation amount ΔI (luminance) is estimated from a display characteristic and an image feature, it can be easily adjusted in a display having a different design. In addition, by using psychological and physical amounts quantized in vision research, disparity control can be exerted with higher accuracy.

2. Second Embodiment

FIGS. 13 and 14 each are a plan view illustrating an RGB sub-pixel and a crosstalk ratio thereof, the schematic diagrams each illustrating a crosstalk ratio dependent on the slope of a parallax element. The slope of a parallax element is 1:3 in FIG. 13, and parallax elements (slits) are provided in the directions indicated in chain lines P. Meanwhile, the slope of a parallax element (slit) is not 1:3 in FIG. 14, and the slope is gentler than the slope in FIG. 13.

If the slope of a parallax element is 1:3, a crosstalk ratio $r=(r_1, r_2, r_3, r_4, \ldots, r_N)$ is uniquely decided. To the contrary, if the slope of a parallax element is not 1:3, a plurality of types of crosstalk ratio $r=(r1, r2, r3, r4, \ldots, r_N)$ are present. The types are represented by M.

A specific example will be described on the basis of FIGS. 13 and 14. The upper figure illustrates the number of a viewpoint to be mapped to each pixel in each of FIGS. 13 and 14. The lower figure illustrates a crosstalk ratio of each pixel.

As illustrated in FIG. 13, a crosstalk ratio is 0.1, which is the smallest, at the position (on the chain line P) of a parallax element (slit), while a crosstalk ratio increases with an increasing distance from the parallax element. As illustrated in FIG. 13, if the slope of a parallax element is 1:3, crosstalk ratios of the respective components of adjacent RGB sub-pixels are equal to each other. That is to say, the crosstalk ratios illustrated in a column 1 (Column 1) are r=(r1, r2, r3, r4, . . . , r6)=(0.13, 0.3, 1, 0.3, 0.13, 0.1) with respect to any of R, G, and B components, and these crosstalk ratios are cyclically repeated in the lower figure of FIG. 13. Additionally, since the number of viewpoints is 6, r=(r1, r2, r3, r4, . . . , r6)=(0.13, 0.3, 1, 0.3, 0.13, 0.1) is cyclically repeated in the first row in a column 3 (Column 3) or later. A luma component is represented as a linear sum of RGB components, so that a crosstalk ratio may be approximately described with a luma component alone.

To the contrary, if the slope of a parallax element is not 1:3, crosstalk ratios of the respective components of adjacent RGB sub-pixels are not equal to each other. For example, as the description is made chiefly for a column 1 (Column 1) in the lower part of FIG. 14, a crosstalk ratio of R components is $r_R=(r_{R1}, r_{R2}, r_{R3}, r_{R4}, \ldots, r_{R8})=(0.1, 0.11, 0.16, 0.45, 0.73, 0.71, 0.55, 0.19)$, a crosstalk ratio of G components is $r_G=(r_{G1}, r_{G2}, r_{G3}, r_{G4}, \ldots, r_{G8})=(0.1, 0.13, 0.25, 0.65, 0.74, 0.66, 0.34, 0.14)$, and a crosstalk ratio of B components is $r_B=(r_{B1}, r_{B2}, r_{B3}, r_{B4}, \ldots, _{B8})=(0.1, 0.11, 0.16, 0.45, 0.73, 0.71, 0.55, 0.19)$, so that the crosstalk ratios of the RGB components are different (the crosstalk ratio of the G components alone is different in this example). Thus, this dispersion of the crosstalk ratios causes color breakup. This dispersion differs at a different position in a display surface, and is cyclic in accordance with the slope of a parallax element. Accordingly, crosstalk causes cyclic color breakup, leading to a striped pattern.

Figure 15:
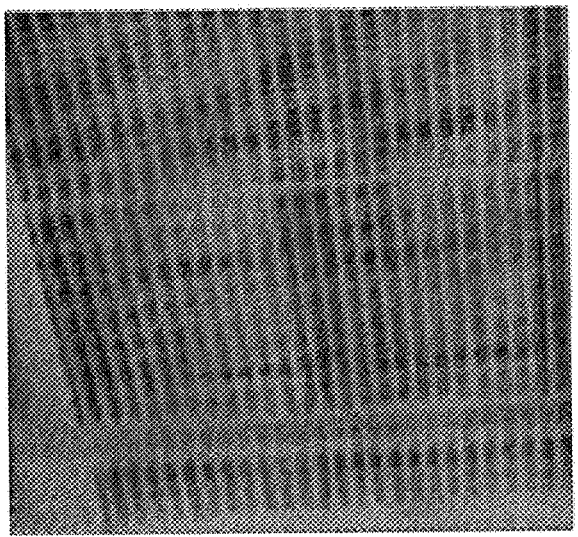
FIG. 15 is a schematic diagram illustrating an example in which a striped pattern occurs because of color breakup.
Figure 15:
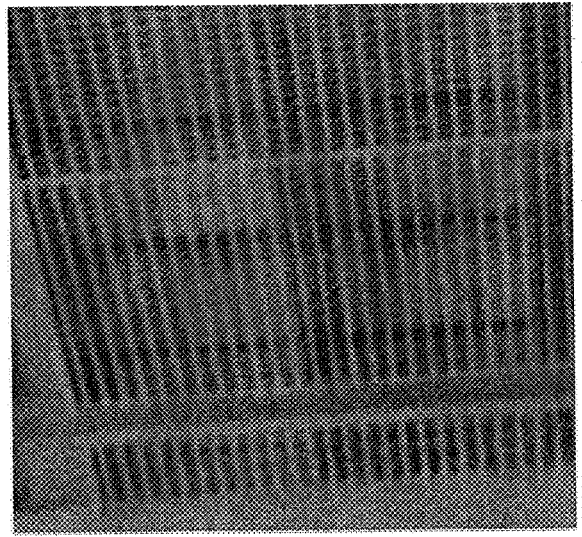

FIG. 15 is a schematic diagram illustrating an example in which color breakup causes a striped pattern. The left figure of FIG. 15 illustrates that the slope of a parallax element is 1:3, and color breakup causes no striped pattern when the slope of the parallax element is 1:3. Meanwhile, the right figure of FIG. 15 illustrates that the slope of a parallax element is not 1:3. As illustrated in the right figure of FIG. 15, when the slope of a parallax element is not 1:3, color breakup causes a striped pattern. In this way, a display that does not have a parallax element slope of 1:3 as its original design experiences the degradation of image quality caused by color breakup.

Different from each of the above-described first embodiment, the second embodiment illustrates that a process is performed for color breakup of RGB components, thereby preventing a pattern caused by the color breakup from occurring.

As discussed above, the following 3 steps are primarily used for learning in the first embodiment.

(First Step) A crosstalk model is applied to a luminance image component, and a crosstalk degradation amount ΔI image is generated while disparity is changing.

(Second Step) A class is defined with the contrast/spatial frequency of a luminance image, and data samples of a disparity transition of the crosstalk degradation amount ΔI are collected for each class from an image group generated in step 1.

(Third Step) A regression analysis is carried out on sample data in each class, and the sample data is converted into a function or a table.

As discussed above, since a crosstalk ratio of RGB sub-pixels is constant when the slope of a parallax element is 1:3, learning alone for luma components, which are a linear sum of RGB is sufficient as described in the first embodiment. However, when the slope of a parallax element is not 1:3, a crosstalk ratio differs at a different position on a display surface, so that there are M types of crosstalk ratio. Thus, the degradation of image quality is represented using M types of crosstalk model to an image of RGB components without degeneration to luma components in the second embodiment. Learning in the second embodiment is conducted in the following 3 steps.

(First Step) Crosstalk models for M types of crosstalk ratio are applied to respective components of RGB images, and crosstalk degradation amount ΔR image, ΔG image, and ΔB image are generated while disparity is changing. Additionally, a crosstalk ratio changes depending on the slope of a parallax element, so that the crosstalk degradation amount ΔR image, ΔG image, and ΔB are obtained in advance for each of M types from crosstalk models for M types of crosstalk ratio depending on the slope of a parallax element. It is also possible to measure a crosstalk ratio as illustrated in the lower part of each of FIGS. 13 and 14 by directly measuring the luminance of a display.

(Second Step) A class is defined with the contrast/spatial frequency for each component of the RGB images, and data samples of a disparity transition of the crosstalk degradation amount ΔI are collected for each class from an image group generated in step 1.

(Third Step) A regression analysis is carried out on sample data in each class, and the sample data is converted into a function or a table.

The above-described 3 steps are used to obtain the first terms (referred to as $\Delta I_R$ hat, $\Delta I_G$ hat, and $\Delta I_B$ hat) on the right sides in the following formulae through learning.

$$\Delta I_R(C_{R\_sf}, \text{disp}) = \widehat{\Delta I}_R(C_{R\_sf}, \text{disp}) + N(\sigma),$$

$$C_{R\_sf} = (C_{R\_0}, C_{R\_1}, \ldots, C_{R\_N-1}) \quad \text{(formula 6)}$$

$$\Delta I_G(C_{G\_sf}, \text{disp}) = \widehat{\Delta I}_G(C_{G\_sf}, \text{disp}) + N(\sigma),$$

$$C_{G\_sf} = (C_{G\_0}, C_{G\_1}, \ldots, C_{G\_N-1}) \quad \text{(formula 7)}$$

$$\Delta I_B(C_{B\_sf}, \text{disp}) = \widehat{\Delta I}_B(C_{B\_sf}, \text{disp}) + N(\sigma),$$

$$C_{B\_sf} = (C_{B\_0}, C_{B\_1}, \ldots, C_{B\_N-1}) \quad \text{(formula 8)}$$

Here, $C_{R\_sf}$ represents an R component contrast vector to be decomposed into N vectors for each spatial frequency, $C_{R\_i}$ represents the contrast of a spatial frequency i in an R component image, and $\Delta I_R$ hat of the first term on the right side in the formula 6 represents a statistical value (function or table) of a disparity transition of a crosstalk degradation amount ΔI in $C_{R\_sf}$ in the R component image.

Similarly, $C_{G\_sf}$ represents a G component contrast vector to be decomposed into N vectors for each spatial frequency, $C_{G\_i}$ represents the contrast of a spatial frequency i in a G component image, and $\Delta I_G$ hat of the first term on the right side in the formula 7 represents a statistical value (function or table) of a disparity transition of a crosstalk degradation amount ΔI in $C_{G\_sf}$ in the G component image. In addition, $C_{B\_sf}$ represents a B component contrast vector to be decomposed into N vectors for each spatial frequency, $C_{B\_i}$ represents the contrast of a spatial frequency i in a B component image, and $\Delta I_B$ hat of the first term on the right side in the formula 8 represents a statistical value (function or table) of a disparity transition of a crosstalk degradation amount ΔI in $C_{B\_sf}$ in the B component image. These $\Delta I_R$ hat, $\Delta I_G$ hat, and $\Delta I_B$ hat are generated as much as the number of types (M types) of crosstalk ratio. More specifically, an index j is assumed to be an integer satisfying $0 \leq j \leq M-1$, and $\Delta I_R^j$ hat, $\Delta I_G^j$ hat, and $\Delta I_B^j$ hat are obtained for each crosstalk ration through learning.

As described in FIG. 9, the process has been performed with the following five steps in the first embodiment.

(First Step) A spatial frequency analysis is carried out on a Y component of an original image with N types of band-pass filter (such as a Gabor filter and a LOG filter) to compute contrast/spatial frequency $C_{sf}$ for each pixel.

(Second Step) A class separation is made on the basis of the information of contrast/spatial frequency $C_{sf}$, and class data in a database of a learning result is used for comparison. After the corresponding class is settled, a model formula of ΔI-disp is retained for each pixel.

(Third Step) A threshold Th for perceiving degradation is input to the model formula of ΔI-disp, a maximum disparity amount is computed for each pixel, and an adjacent viewpoint disparity map is generated.

(Fourth Step) Each pixel of the adjacent viewpoint disparity map is divided by a value of an LR disparity map having the same coordinates, and converted into an adjacent viewpoint phase difference map.

(Fifth Step) The adjacent viewpoint phase difference map is counted as a frequency histogram for each phase difference, and a phase difference at which the number of pixels exceeding a critical value is less than or equal to a given number is decided.

Figure 16:
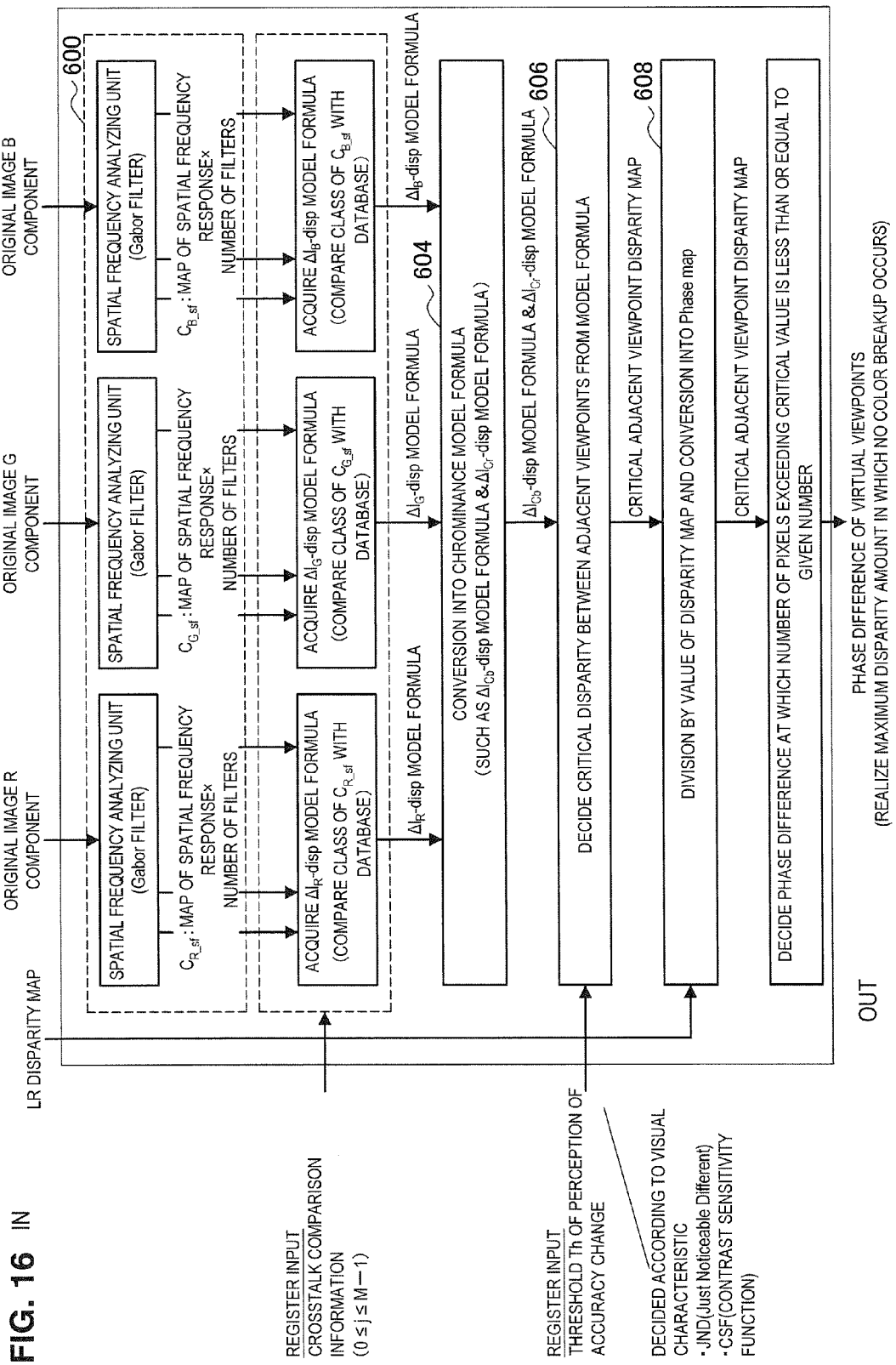
FIG. 16 is a schematic diagram for describing a process flow of disparity control algorithm in a second embodiment.

In contrast, the process in the first embodiment is extended to a chroma component in the second embodiment, and a crosstalk degradation amount ΔI of a chroma component is computed as illustrated in FIG. 16. As illustrated in FIG. 16, the image processing device 1000 includes a spatial frequency analyzing unit 600, a disparity transition information acquiring unit 602, a chrominance conversion unit 604, an adjacent viewpoint disparity calculating unit 606, a conversion unit 608, and a phase difference deciding unit 610. A process of the image processing device 1000 according to the second embodiment includes the following 6 steps.

(First Step: Spatial Frequency Analyzing Unit 600) A spatial frequency analysis is carried out on each of RGB components of an original image with N types of band-pass filter (such as a Gabor filter and a LOG filter) to compute contrast/spatial frequency $C_{R\_sf}$, $C_{G\_sf}$, and $C_{B\_sf}$ for each pixel.

(Second Step: Disparity Transition Information Acquiring Unit 602) An index j of a crosstalk ratio is decided from information on a crosstalk ratio for each pixel (retained in advance as an index map of an integer j ($0 \leq j \leq M-1$). A class separation is made on the basis of information on the contrast/spatial frequency $C_{R\_sf}$, $C_{G\_sf}$, $C_{B\_sf}$ of each of the RGB components, which is compared with class data in a database of a learning result, the class data corresponding to the index j of the crosstalk ratio. After the corresponding class is settled, $\Delta I_R^j$ hat, $\Delta I_G^j$ hat, and $\Delta I_B^j$ hat (model formula of ΔI-disp of each of RGB components) is retained for each pixel.

(Third Step: Chrominance Conversion Unit 604) Graphs of $\Delta I_R^j$ hat, $\Delta I_G^j$ hat, and $\Delta I_B^j$ hat are integrated, and a ΔI-disp model formula is newly generated for a chroma component.

(Fourth Step: Adjacent Viewpoint Disparity Calculating Unit 606) A threshold Th for perceiving degradation is input to the ΔI-disp model formula of a chroma component, a maximum disparity amount is computed for each pixel, and an adjacent viewpoint disparity map is generated.

(Fifth Step: Conversion Unit 608) Each pixel of the adjacent viewpoint disparity map is divided by a value of an LR disparity map having the same coordinates, and converted into an adjacent viewpoint phase difference map.

(Sixth Step: Phase Difference Deciding Unit 610) The adjacent viewpoint phase difference map is counted as a frequency histogram for each phase difference, and a phase difference at which the number of pixels exceeding a critical value is less than or equal to a given number is decided.

As described above, the first embodiment in which the algorithm is for a luma component is extended in the first and second steps, and crosstalk of RGB components is taken into consideration. Furthermore, perception of a human to a chroma component is taken into consideration in the third and fourth steps. It is possible to perform a process in the same framework as in the first embodiment in the fifth and sixth steps. In this process, a chroma component of a human in the third and fourth steps can take a variety of embodiments. The detailed description will be made below for the third and fourth steps.

The chrominance of RGB is evaluated with a Cb component and a Cr component in a YcBCr space. In this case, conversion formulae from RGB to YCbCr are expressed in the following formulae (formula 9).

$$Y=0.2126*R+0.7152*G+0.0722*B$$

$$Cb=-0.1146*R-0.3854*G+0.5000*B$$

$$Cr=0.5000*R-0.4542*G-0.0458*B$$

The above-described formulae are linear, so that if change amounts by crosstalk $\Delta I_R^j$ hat, $\Delta I_G^j$ hat, and $\Delta I_B^j$ hat are put into R, G, and B in the formula 9, respectively, the following can be obtained as functions of crosstalk degradation amounts of chroma components.

$$\widehat{\Delta I}_{Cb}^j(C_{R\_sf}, C_{G\_sf}, C_{B\_sf}, disp)$$

$$\widehat{\Delta I}_{Cr}^j(C_{R\_sf}, C_{G\_sf}, C_{B\_sf}, disp)$$

The respective functions of the crosstalk degradation amounts of the chroma components will be referred to as $\Delta I_{Cb}^j$ hat and $\Delta I_{Cr}^i$ hat below.

Figure 17:
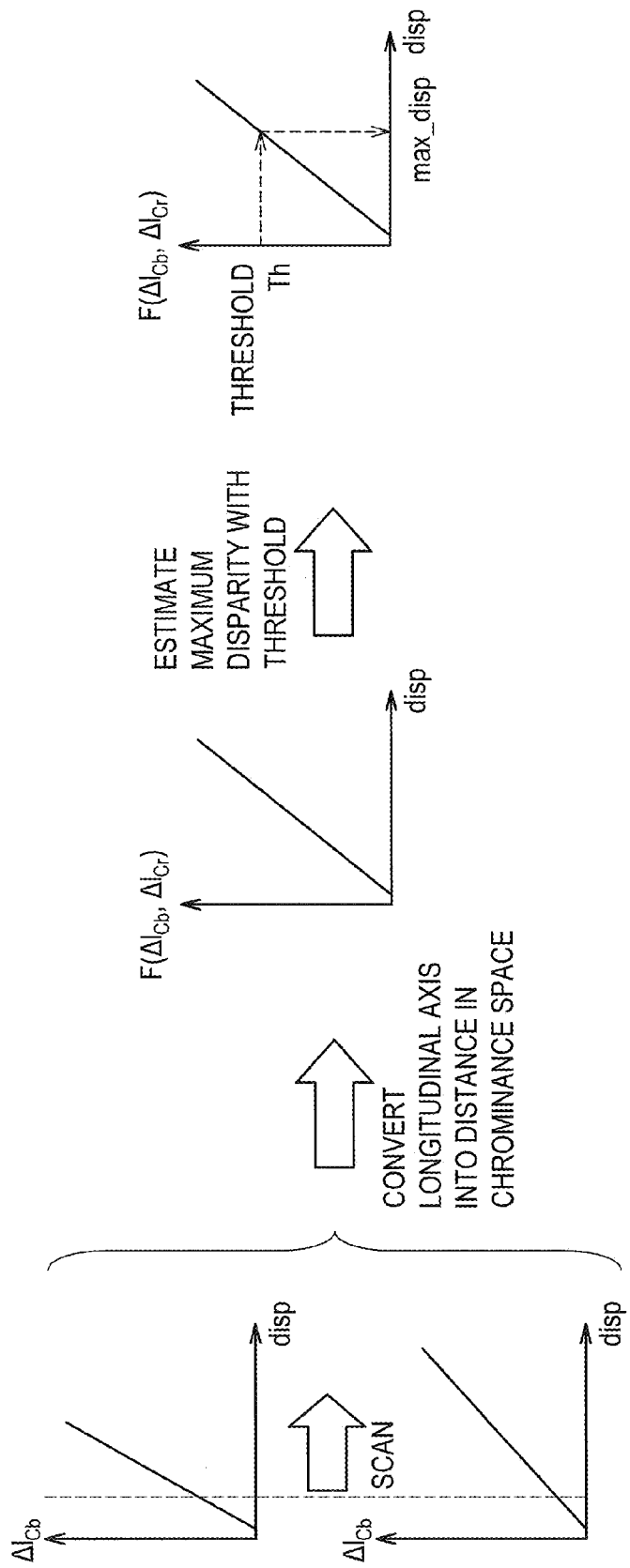
FIG. 17 is a schematic diagram illustrating a method for estimating a maximum disparity amount in which color breakup does not occur.

FIG. 17 illustrates a method for estimating a maximum disparity amount in which color breakup does not occur from $\Delta I_{Cb}^j$ hat and $\Delta I_{Cr}^i$ hat obtained in this way. As illustrated in FIG. 37, each graph is scanned along the disp (disparity) axis, and an evaluation function $F(\Delta I_{Cb}, \Delta I_{Cr})$ representing color breakup is used to integrate $\Delta I_{Cb}^j$ hat and $\Delta I_{Cr}^j$ hat into a single graph. For example, an evaluation function representing color breakup can be defined in the following way.

$$F(\Delta I_{Cb}, \Delta I_{Cr})=(\Delta I_{Cb}^2+\Delta I_{Cr}^2)^{1/2} \quad \text{(formula 10)}$$

The formula 10 represents, as a distance, a change from the original chrominance in a Cb-Cr chrominance space (two-dimension). That is to say, each graph of $\Delta I_{Cb}^J$ hat and $\Delta I_{Cr}^j$ hat illustrated in the left part of FIG. 17 is scanned along the disp (disparity) axis, the distance between $\Delta I_{Cb}$ and $\Delta I_{Cr}$ corresponding to the disparity in the Cb-Cr chrominance space (two-dimension) (intermediate characteristic in FIG. 17) is obtained. Additionally, any other evaluation functions than the formula 10 can also represent color breakup. For example an angular shift from the origin (achromatic color) in the Cb-Cr chrominance space may be defined to define an evaluation function representing a hue shift. Furthermore, the present embodiment has described a color space representing color breakup by using a YCbCr space, and yet a similar process may be used in a CIE L*a*b* space (nonlinear), which takes a color perception characteristic of human vision more into consideration.

If a threshold Th for color breakup perception is input to the longitudinal axis in a graph (rightmost graph in FIG. 17) for evaluating color breakup obtained in this way, it is possible to compute a maximum disparity amount max_disp in which color breakup is not perceived.

Additionally, the second embodiment can be used along with the first embodiment. A maximum adjacent viewpoint phase difference map is computed in both of the first and second embodiments, but disparity control that takes image ghosting and doubling, and color breakup into consideration can be exerted by comparing the magnitude of values of maps for each pixel, newly updating a smaller value as a value of the maximum adjacent viewpoint phase difference map, and then performing computing for deciding a representative phase difference with the frequency histogram.

Additionally, a process of analyzing contrast according to a spatial frequency of an image of each of RGB components is performed in the second embodiment, but it is also possible to use the technique according to the first embodiment to analyze the contrast according to the spatial frequency after the RGB image is converted into a luminance image. For example, the conversion of an RGB image into a luminance image can be computed with linear conversion using the RGB image. Accordingly, as in the first embodiment, it is possible to estimate the degradation of image quality of a luma component, estimate maximum disparity in which no image ghosting or image doubling occurs, and optimally adjust the disparity.

As described above, according to the second embodiment, it is possible to use the disparity display performance of a display to the maximum by taking into consideration an image feature (contrast/spatial frequency) in addition to a display characteristic (crosstalk to each of RGB components) and estimating, with high accuracy, a critical disparity amount in which color breakup almost occurs. This allows a stereoscopic sense, a sense of depth, and image quality in a tradeoff relationship to be optimized, thereby allowing a user to have a video experience with a clear sense of presence. The technology is of great versatility, and is adjustable for a display having a different design without relying on a user's experience.

Furthermore, since a crosstalk degradation amount ΔI (chrominance) is estimated from the display characteristics and image feature, it can be easily adjusted in a display having a different design. In addition, by using psychological and physical amounts quantized in vision research, disparity control can be realized with higher accuracy.

It should be understood by those skilled in the art that various modifications, combinations, sub-combinations and alterations may occur depending on design requirements and other factors insofar as they are within the scope of the appended claims or the equivalents thereof.

The advantageous effects described herein are merely explanatory or illustrative, but not limited. That is to say, the technology according to the present disclosure may attain other advantageous effects obvious to those skilled in the art from the present specification in combination with the above-described advantageous effects or instead thereof.

Additionally, the present technology may also be configured as below.

(1) An image processing method including:
analyzing contrast according to a spatial frequency of an input image for each RGB pixel;
referencing a database in which a relationship between a crosstalk degradation amount and a disparity transition for each RGB pixel is stored in association with contrast according to spatial frequencies of various images, and acquiring a relationship between a crosstalk degradation amount and a disparity transition for each RGB pixel, the relationship corresponding to the contrast according to the spatial frequency of the input image;
integrating the relationship between the crosstalk degradation amount and the disparity transition, the relationship having been acquired for each RGB pixel; and
calculating disparity corresponding to a predetermined threshold set to the crosstalk degradation amount in the integrated relationship between the crosstalk degradation amount and the disparity transition.

(2) The image processing method according to (1), further including:
converting the calculated disparity into a phase difference on the basis of disparity of left and right images; and deciding the phase difference in a manner that a number of pixels exceeding a critical value among pixels of the input image is less than or equal to a given number.

(3) The image processing method according to (1) or (2),
wherein the relationship between the crosstalk degradation amount and the disparity transition for each RGB pixel is stored in the database in association with the contrast according to the spatial frequencies of the various images for each type of crosstalk ratio of each RGB pixel according to a slope of a parallax element installed in a display device that displays an image.

(4) The image processing method according to any one of (1) to (3),
wherein the relationship between the crosstalk degradation amount and the disparity transition is acquired for each type of crosstalk ratio according to a slope of a parallax element installed in a display device that displays an image, the relationship corresponding to the contrast according to the spatial frequency of the input image.

(5) The image processing method according to any one of (1) to (4), further including:
creating the database through learning,
wherein the creating the database through learning includes
  analyzing, for each RGB pixel, contrast according to spatial frequencies of various images that have been input, and
  classifying the various images for each RGB pixel on the basis of the contrast according to the spatial frequency, and acquiring the relationship between the crosstalk degradation amount and the disparity transition for each RGB pixel through a crosstalk model formula.

(6) An image processing device including:
an analysis unit configured to analyze contrast according to a spatial frequency of an input image for each RGB pixel;
a disparity transition information acquiring unit configured to reference a database in which a relationship between a crosstalk degradation amount and a disparity transition for each RGB pixel is stored in association with contrast according to spatial frequencies of various images, and to acquire a relationship between a crosstalk degradation amount and a disparity transition for each RGB pixel, the relationship corresponding to the contrast according to the spatial frequency of the input image;
an integration unit configured to integrate the relationship between the crosstalk degradation amount and the disparity transition, the relationship having been acquired for each RGB pixel; and
a disparity calculation unit configured to calculate disparity corresponding to a predetermined threshold set to the crosstalk degradation amount in the integrated relationship between the crosstalk degradation amount and the disparity transition.

(7) An electronic apparatus including:
an analysis unit configured to analyze contrast according to a spatial frequency of an input image for each RGB pixel;
a disparity transition information acquiring unit configured to reference a database in which a relationship between a crosstalk degradation amount and a disparity transition for each RGB pixel is stored in association with contrast according to spatial frequencies of various images, and to acquire a relationship between a crosstalk degradation amount and a disparity transition for each RGB pixel, the relationship corresponding to the contrast according to the spatial frequency of the input image;
an integration unit configured to integrate the relationship between the crosstalk degradation amount and the disparity transition, the relationship having been acquired for each RGB pixel;
a disparity calculation unit configured to calculate disparity corresponding to a predetermined threshold set to the crosstalk degradation amount in the integrated relationship between the crosstalk degradation amount and the disparity transition;
a phase difference converting unit configured to convert the calculated disparity into a phase difference on the basis of disparity of left and right images;
a phase difference deciding unit configured to decide the phase difference in a manner that a number of pixels exceeding a critical value among pixels of the input image is less than or equal to a given number; and
a display unit configured to display the input image on the basis of the phase difference decided by the phase difference deciding unit.

(8) An image processing method including:
analyzing contrast according to a spatial frequency of an input image, the input image being acquired when an RGB image is converted into a luminance image;
referencing a database in which a relationship between a crosstalk degradation amount and a disparity transition is stored in association with contrast according to spatial frequencies of various images, and acquiring a relationship between a crosstalk degradation amount and a disparity transition, the relationship corresponding to the contrast according to the spatial frequency of the input image; and
calculating disparity corresponding to a predetermined threshold set to the crosstalk degradation amount in the acquired relationship between the crosstalk degradation amount and the disparity transition.

(9) The image processing method according to (8), further including:
converting the calculated disparity into a phase difference on the basis of disparity of an image for a left eye and an image for a right eye; and
deciding the phase difference in a manner that a number of pixels exceeding a critical value among pixels of the input image is less than or equal to a given number.

(10) An image processing device including:
an analysis unit configured to analyze contrast according to a spatial frequency of an input image, the input image being acquired when an RGB image is converted into a luminance image;
a disparity transition information acquiring unit configured to reference a database in which a relationship between a crosstalk degradation amount and a disparity transition is stored in association with contrast according to spatial frequencies of various images, and to acquire a relationship between a crosstalk degradation amount and a disparity transition, the relationship corresponding to the contrast according the spatial frequency of the input image; and
a disparity calculation unit configured to calculate disparity corresponding to a predetermined threshold set to the crosstalk degradation amount in the acquired relationship between the crosstalk degradation amount and the disparity transition.

(11) An electronic apparatus including:
an analysis unit configured to analyze contrast according to a spatial frequency of an input image, the input image being acquired when an RGB image is converted into a luminance image;
a disparity transition information acquiring unit configured to reference a database in which a relationship between a crosstalk degradation amount and a disparity transition is stored in association with contrast according to spatial frequencies of various images, and to acquire a relationship between a crosstalk degradation amount and a disparity transition, the relationship corresponding to the contrast according the spatial frequency of the input image;

a disparity calculation unit configured to calculate disparity corresponding to a predetermined threshold set to the crosstalk degradation amount in the acquired relationship between the crosstalk degradation amount and the disparity transition;

a phase difference converting unit configured to convert the calculated disparity into a phase difference on the basis of disparity of left and right images;

a phase difference deciding unit configured to decide the phase difference in a manner that a number of pixels exceeding a critical value among pixels of the input image is less than or equal to a given number; and a display unit configured to display the input image on the basis of the phase difference decided by the phase difference deciding unit.

What is claimed is:

1. An image processing method comprising:
   analyzing contrast according to a spatial frequency of an input image for each RGB pixel;
   referencing a database in which a relationship between a crosstalk degradation amount and a disparity transition for each RGB pixel is stored in association with contrast according to spatial frequencies of various images, and acquiring a relationship between a crosstalk degradation amount and a disparity transition for each RGB pixel, the relationship corresponding to the contrast according to the spatial frequency of the input image;
   integrating the relationship between the crosstalk degradation amount and the disparity transition, the relationship having been acquired for each RGB pixel; and
   calculating disparity corresponding to a predetermined threshold set to the crosstalk degradation amount in the integrated relationship between the crosstalk degradation amount and the disparity transition.

2. The image processing method according to claim 1, further comprising:
   converting the calculated disparity into a phase difference on the basis of disparity of left and right images; and
   deciding the phase difference in a manner that a number of pixels exceeding a critical value among pixels of the input image is less than or equal to a given number.

3. The image processing method according to claim 1, wherein the relationship between the crosstalk degradation amount and the disparity transition for each RGB pixel is stored in the database in association with the contrast according to the spatial frequencies of the various images for each type of crosstalk ratio of each RGB pixel according to a slope of a parallax element installed in a display device that displays an image.

4. The image processing method according to claim 1, wherein the relationship between the crosstalk degradation amount and the disparity transition is acquired for each type of crosstalk ratio according to a slope of a parallax element installed in a display device that displays an image, the relationship corresponding to the contrast according to the spatial frequency of the input image.

5. The image processing method according to claim 1, further comprising:
   creating the database through learning,
   wherein the creating the database through learning includes
   analyzing, for each RGB pixel, contrast according to spatial frequencies of various images that have been input, and
   classifying the various images for each RGB pixel on the basis of the contrast according to the spatial frequency, and acquiring the relationship between the crosstalk degradation amount and the disparity transition for each RGB pixel through a crosstalk model formula.

6. An image processing device comprising:
   an analysis unit configured to analyze contrast according to a spatial frequency of an input image for each RGB pixel;
   a disparity transition information acquiring unit configured to reference a database in which a relationship between a crosstalk degradation amount and a disparity transition for each RGB pixel is stored in association with contrast according to spatial frequencies of various images, and to acquire a relationship between a crosstalk degradation amount and a disparity transition for each RGB pixel, the relationship corresponding to the contrast according to the spatial frequency of the input image;
   an integration unit configured to integrate the relationship between the crosstalk degradation amount and the disparity transition, the relationship having been acquired for each RGB pixel; and
   a disparity calculation unit configured to calculate disparity corresponding to a predetermined threshold set to the crosstalk degradation amount in the integrated relationship between the crosstalk degradation amount and the disparity transition.

7. An electronic apparatus comprising:
   an analysis unit configured to analyze contrast according to a spatial frequency of an input image for each RGB pixel;
   a disparity transition information acquiring unit configured to reference a database in which a relationship between a crosstalk degradation amount and a disparity transition for each RGB pixel is stored in association with contrast according to spatial frequencies of various images, and to acquire a relationship between a crosstalk degradation amount and a disparity transition for each RGB pixel, the relationship corresponding to the contrast according to the spatial frequency of the input image;
   an integration unit configured to integrate the relationship between the crosstalk degradation amount and the disparity transition, the relationship having been acquired for each RGB pixel;
   a disparity calculation unit configured to calculate disparity corresponding to a predetermined threshold set to the crosstalk degradation amount in the integrated relationship between the crosstalk degradation amount and the disparity transition;
   a phase difference converting unit configured to convert the calculated disparity into a phase difference on the basis of disparity of left and right images;
   a phase difference deciding unit configured to decide the phase difference in a manner that a number of pixels exceeding a critical value among pixels of the input image is less than or equal to a given number; and a display unit configured to display the input image on the basis of the phase difference decided by the phase difference deciding unit.

8. An image processing method comprising:

analyzing contrast according to a spatial frequency of an input image, the input image being acquired when an RGB image is converted into a luminance image;

referencing a database in which a relationship between a crosstalk degradation amount and a disparity transition is stored in association with contrast according to spatial frequencies of various images, and acquiring a relationship between a crosstalk degradation amount and a disparity transition, the relationship corresponding to the contrast according to the spatial frequency of the input image; and calculating disparity corresponding to a predetermined threshold set to the crosstalk degradation amount in the acquired relationship between the crosstalk degradation amount and the disparity transition.

9. The image processing method according to claim 8, further comprising:

converting the calculated disparity into a phase difference on the basis of disparity of an image for a left eye and an image for a right eye; and deciding the phase difference in a manner that a number of pixels exceeding a critical value among pixels of the input image is less than or equal to a given number.

10. An image processing device comprising:

an analysis unit configured to analyze contrast according to a spatial frequency of an input image, the input image being acquired when an RGB image is converted into a luminance image;

a disparity transition information acquiring unit configured to reference a database in which a relationship between a crosstalk degradation amount and a disparity transition is stored in association with contrast according to spatial frequencies of various images, and to acquire a relationship between a crosstalk degradation amount and a disparity transition, the relationship corresponding to the contrast according the spatial frequency of the input image; and a disparity calculation unit configured to calculate disparity corresponding to a predetermined threshold set to the crosstalk degradation amount in the acquired relationship between the crosstalk degradation amount and the disparity transition.

11. An electronic apparatus comprising:

an analysis unit configured to analyze contrast according to a spatial frequency of an input image, the input image being acquired when an RGB image is converted into a luminance image;

a disparity transition information acquiring unit configured to reference a database in which a relationship between a crosstalk degradation amount and a disparity transition is stored in association with contrast according to spatial frequencies of various images, and to acquire a relationship between a crosstalk degradation amount and a disparity transition, the relationship corresponding to the contrast according the spatial frequency of the input image;

a disparity calculation unit configured to calculate disparity corresponding to a predetermined threshold set to the crosstalk degradation amount in the acquired relationship between the crosstalk degradation amount and the disparity transition;

a phase difference converting unit configured to convert the calculated disparity into a phase difference on the basis of disparity of left and right images;

a phase difference deciding unit configured to decide the phase difference in a manner that a number of pixels exceeding a critical value among pixels of the input image is less than or equal to a given number; and a display unit configured to display the input image on the basis of the phase difference decided by the phase difference deciding unit.

* * * * *